US 9,363,820 B2

(12) United States Patent
Wang

(10) Patent No.: US 9,363,820 B2
(45) Date of Patent: Jun. 7, 2016

(54) METHOD OF UPLINK CONTROL INFORMATION TRANSMISSION

(75) Inventor: Chun-Yen Wang, Tainan (TW)

(73) Assignee: Industrial Technology Research Institute, Chutung, Hsinchu (TW)

(*) Notice: Subject to any disclaimer, the term of this patent is extended or adjusted under 35 U.S.C. 154(b) by 119 days.

(21) Appl. No.: 13/571,380

(22) Filed: Aug. 10, 2012

(65) Prior Publication Data

US 2013/0039231 A1 Feb. 14, 2013

Related U.S. Application Data

(60) Provisional application No. 61/522,255, filed on Aug. 11, 2011.

(51) Int. Cl.
| H04B 7/00 | (2006.01) |
| H04W 72/10 | (2009.01) |
| H04L 1/18 | (2006.01) |
| H04L 5/00 | (2006.01) |
| H04L 5/14 | (2006.01) |
| H04W 72/12 | (2009.01) |

(52) U.S. Cl.
CPC ............. *H04W 72/10* (2013.01); *H04L 1/1861* (2013.01); *H04L 5/001* (2013.01); *H04L 5/0053* (2013.01); *H04L 5/1469* (2013.01); *H04L 5/0055* (2013.01); *H04L 5/0057* (2013.01); *H04W 72/1284* (2013.01)

(58) Field of Classification Search
CPC ... H04W 76/02; H04W 76/025; H04W 76/04; H04W 76/046
USPC ........................... 370/310, 328, 329, 343, 345
See application file for complete search history.

(56) References Cited

U.S. PATENT DOCUMENTS

| 8,934,459 B2 * | 1/2015 | Marinier ................. H04L 5/001 370/336 |
| 9,210,695 B2 * | 12/2015 | Kim .................... H04W 72/0413 |
| 2010/0322173 A1 | 12/2010 | Marinier | |
| 2011/0134774 A1 | 6/2011 | Pelletier | |

(Continued)

FOREIGN PATENT DOCUMENTS

| CN | 101932116 A | 12/2010 |
| CN | 101989897 A | 3/2011 |

(Continued)

OTHER PUBLICATIONS

CMCC, DL and UL linking in CA, 3GPP TSG-RAN WG2 Meeting #69bis, R2-102423, Apr. 12-16, 2010, pp. 1-5, XP050422675, Beijing, P. R. China.

(Continued)

*Primary Examiner* — Dmitry H Levitan
(74) *Attorney, Agent, or Firm* — Winston Hsu; Scott Margo

(57) ABSTRACT

A method of uplink control information transmission for a mobile device with carrier aggregation in a wireless communication system is disclosed. The method comprises being configured a plurality of cells including a primary cell and at least a secondary cell by a network of the wireless communication system, determining to transmit the uplink control information in a transmission time interval, and when the primary cell has no uplink resource for the uplink control information transmission, transmitting the uplink control information on at least a secondary cell having uplink resources in the TTI.

13 Claims, 27 Drawing Sheets

(56) References Cited

U.S. PATENT DOCUMENTS

| | | |
|---|---|---|
| 2011/0269490 A1 | 11/2011 | Earnshaw |
| 2012/0008600 A1* | 1/2012 | Marinier et al. ............ 370/336 |
| 2012/0082107 A1 | 4/2012 | Ou |
| 2012/0093073 A1* | 4/2012 | Lunttila et al. ............ 370/328 |
| 2012/0113827 A1* | 5/2012 | Yamada et al. ............ 370/252 |
| 2012/0113831 A1* | 5/2012 | Pelletier et al. ............ 370/252 |
| 2012/0207109 A1* | 8/2012 | Pajukoski et al. ............ 370/329 |
| 2012/0327821 A1* | 12/2012 | Lin et al. ............ 370/280 |
| 2013/0114554 A1* | 5/2013 | Yang et al. ............ 370/329 |
| 2013/0121299 A1* | 5/2013 | Kim et al. ............ 370/329 |
| 2013/0250822 A1* | 9/2013 | Yang et al. ............ 370/280 |
| 2013/0322307 A1* | 12/2013 | Yang et al. ............ 370/280 |
| 2014/0003392 A1* | 1/2014 | Yang et al. ............ 370/331 |

FOREIGN PATENT DOCUMENTS

| | | |
|---|---|---|
| CN | 102104972 A | 6/2011 |
| JP | 2013511916 A | 4/2013 |
| WO | 2010148319 A1 | 12/2010 |
| WO | 2011063244 A2 | 5/2011 |
| WO | 2011085200 A1 | 7/2011 |

OTHER PUBLICATIONS

Ericsson et al, Random Access Failure Handling on SCell, 3GPP TSG-RAN WG2 #77, Tdoc R2-120482, Feb. 6-10, 2012, pp. 1-3, XP050565411, Dresden, Germany.

Nokia Siemens Networks, Nokia Corporation, Cell specific TDD configuration with inter-band CA, 3GPP TSG-RAN WG2 Meeting #74, R2-112946, May 9-13, 2011, XP050495304, Barcelona, Spain.

Intel Corporation, Support of Mixed Inter-Band TDD Configurations in Rel-11 CA, 3GPP TSG RAN2#74 meeting, R2-113216, May 9-13, 2011, pp. 1-3, XP050495383, Barcelona, Spain.

Renesas Mobile Europe, Operation Principles of CC specific TDD Configuration, 3GPP TSG-RAN WG2 Meeting #74, R2-112938, May 9-13, 2011, XP050495150, Barcelona.

* cited by examiner

| UL-DL Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

| Subframe | 0 | 1 | 2 | 3 | 4 | 5 | 6 | 7 | 8 | 9 | |
|---|---|---|---|---|---|---|---|---|---|---|---|
| Cell#0 (PCell) | D | S | U | D | D | D | S | U | D | D | Activated |
| Cell#1 (SCell) | D | S | U | U | U | D | D | D | D | D | Activated |
| Cell#2 (SCell) | D | S | U | U | D | D | S | U | U | D | Activated |

UL ACK/NACK feedbacks for DL transmission from Cell #0~3 may be sent on Cell #1

Aperiodic CQI reporting for the Cell #2 is sent on the Cell #2

FIG. 17

| Subframe | 0 | 1 | 2 | 3 | 4 | 5 | 6 | 7 | 8 | 9 |
|---|---|---|---|---|---|---|---|---|---|---|
| Cell#0 (PCell) FDD system | D | D | D | D | D | D | D | D | D | D |
| | U | U | U | U | U | U | U | U | U | U |
| Cell#1 (SCell) TDD system | D | S | U | U | U | D | D | D | D | D |

FIG. 19

| Subframe | 0 | 1 | 2 | 3 | 4 | 5 | 6 | 7 | 8 | 9 |
|---|---|---|---|---|---|---|---|---|---|---|
| UL-DL Config. #2 for Cell#0 (PCell) | D | S | U | D | D | D | S | U | D | D |
| UL-DL Config. #3 for Cell#1 (SCell) | D | S | U | U | U | D | D | D | D | D |

FIG. 25

METHOD OF UPLINK CONTROL INFORMATION TRANSMISSION

CROSS REFERENCE TO RELATED APPLICATIONS

This application claims the benefit of U.S. Provisional Application No. 61/522,255, filed on Aug. 11, 2011 and entitled "Methods and System of Uplink Control Information Feedbacks for Carrier Aggregation", the contents of which are incorporated herein in their entirety.

BACKGROUND OF THE INVENTION

1. Field of the Invention

The present invention relates to a method used in a wireless communication system and related communication device, and more particularly, to a method of uplink control information transmission in a wireless communication system.

2. Description of the Prior Art

A long term evolution-advanced (LTE-A) system, as its name implies, is an evolution of the LTE system. The LTE-A system targets faster switching between power states, improves performance at the coverage edge of the eNB, and includes subjects, such as bandwidth extension, coordinated multipoint transmission/reception (CoMP), UL multiple-input multiple-output (MIMO), etc.

For bandwidth extension, a carrier aggregation (CA) is introduced to the LTE-A system by which two or more component carriers are aggregated to achieve a wider-band transmission. Accordingly, the LTE-A system can support a wider bandwidth up to 100 MHz by aggregating a maximum number of 5 component carriers, where bandwidth of each component carrier is 20 MHz and is backward compatible with 3GPP Rel-8. An LTE-A specification supports CA for both continuous and non-continuous component carriers with each component carrier limited to a maximum of 110 resource blocks. The CA increases a bandwidth flexibility by aggregating the non-continuous component carriers. In addition, in carrier aggregation, the UE only has one RRC connection with the network. At RRC connection establishment/re-establishment/handover, one serving cell provides the NAS mobility information, and at RRC connection re-establishment/handover, one serving cell provides the security input. This cell is referred to as a primary cell (PCell). In the downlink, the component carrier corresponding to the PCell is the downlink primary component carrier (DL PCC) while in the uplink it is the uplink primary component carrier (UL PCC). In addition, cells other than the PCell are named secondary cell (SCell).

Further, for Rel-11, carrier aggregation is supported by both formats of LTE-A system, namely the Frequency Division Duplex (FDD) and Time Division Duplex (TDD) variants. The aggregated component carriers operated on TDD system may have different UL-DL configurations. The supported UL-DL configurations are listed in FIG. 1. As can be seen, 7 UL-DL configurations are supported in LTE TDD systems. In FIG. 1, the UL-DL configuration #0 implies that subframes '0' and '5' are DL subframes, subframes '1' and '6' are special subframes, and subframes '2', '3', '4', '7', '8', '9' are UL subframes.

Uplink control information includes an acknowledgement/negative acknowledgement (ACK/NACK) feedback, a channel quality indicator (CQI) report, a precoding matrix indicator (PMI) report, a rank indicator (RI) report, a precoding type indicator (PTI), channel state information (CSI), and scheduling request (SR), etc. In LTE system, a UE transmits the uplink control information to the eNB on a physical uplink control channel (PUCCH). However, the applicant notices a problem associated to the uplink control information transmission. In Rel-10, UE is configured with more than one serving cell (i.e. one PCell and one or more SCells), but PUCCH is transmitted only on the PCell. On the other hand, in Rel-11, each serving cell may have different UL-DL configurations. Hence, the conflicting situation may happen when PCell is downlink and one of the SCell is uplink on the same subframe. In detail, please refer to FIG. 2, which is a schematic diagram of uplink control information transmission on cells with different UL-DL configurations. In FIG. 2, a UE is configured with a Cell 1 as PCell and a Cell 2 as SCell. In addition, the Cell 1 is configured with UL-DL configuration #1 and the Cell 3 is configured with UL-DL configuration #0 as shown in FIG. 1. The UE receives PDSCH transmissions in DL subframe '0' on Cell 1 and in DL subframe '0' on Cell 3. In this situation, the UE shall reply ACK/NACK in subframe '4' for the PDSCH transmission in DL subframe '0' on SCell. Conventionally, the UE transmits PUCCH only on the PCell (namely Cell 1). However, as shown in FIG. 2, the subframe '4' on Cell 1 is a DL subframe. Thus, no PUCCH resource in subframe '4' on PCell is for the UE to feedback ACK/NACK. In this situation, the UE cannot transmit PUCCH for the UCI (e.g. ACK/NACK, CQI, PMI, RI and/or CSI) on the PCell. Without clear specification, the UE does not know how to deal with this situation.

SUMMARY OF THE INVENTION

The disclosure therefore provides a method of uplink control information transmission to solve the abovementioned problems.

A method of uplink control information transmission for a mobile device with carrier aggregation in a wireless communication system is disclosed. The method comprises being configured a plurality of cells including a primary cell and at least a secondary cell by a network of the wireless communication system, determining to transmit the uplink control information in a transmission time interval, and when the primary cell has no uplink resource for the uplink control information transmission, transmitting the uplink control information on at least a secondary cell having uplink resources in the TTI.

A method of uplink control information transmission for a mobile device with carrier aggregation in a wireless communication system is disclosed. The method comprises being configured a plurality of cells including a primary cell and at least a secondary cell by a network of the wireless communication system, determining to transmit the uplink control information in a subframe on the primary cell in a transmission time interval, and when the subframe on the primary cell for the uplink control information transmission is a downlink subframe, transmitting the uplink control information in an uplink subframe after the subframe on the primary cell in the TTI.

A method of uplink control information transmission for a mobile device with carrier aggregation in a wireless communication system is disclosed. The method comprises being configured a plurality of cells including a primary cell and at least a secondary cell by a network of the wireless communication system, determining to transmit the uplink control information in a subframe on the primary cell in a transmission time interval, and when the subframe on the primary cell for the uplink control information transmission is a downlink subframe, dropping the uplink control information transmission.

A method of uplink control information transmission for a mobile device with carrier aggregation in a wireless communication system is disclosed. The method comprises being configured a plurality of cells including a primary cell and at least a secondary cell by a network of the wireless communication system, receiving a downlink signalling on a cell of the plurality of cells, determining to transmit the uplink control information in a subframe on the primary cell in a transmission time interval, and when the subframe on the primary cell for the uplink control information transmission is a downlink subframe, determining whether to drop the uplink control information according to an uplink grant information in the downlink signalling.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a schematic diagram of UL-DL configurations according to the prior art.

FIGS. 7-17 are schematic diagrams of uplink control information transmission according to different embodiments.

FIG. 19 is a schematic diagram of cells with FDD system and TDD system.

FIG. 25 is a schematic diagram of a UE dropping an uplink control information transmission according to the present invention.

DETAILED DESCRIPTION

Figure 2:
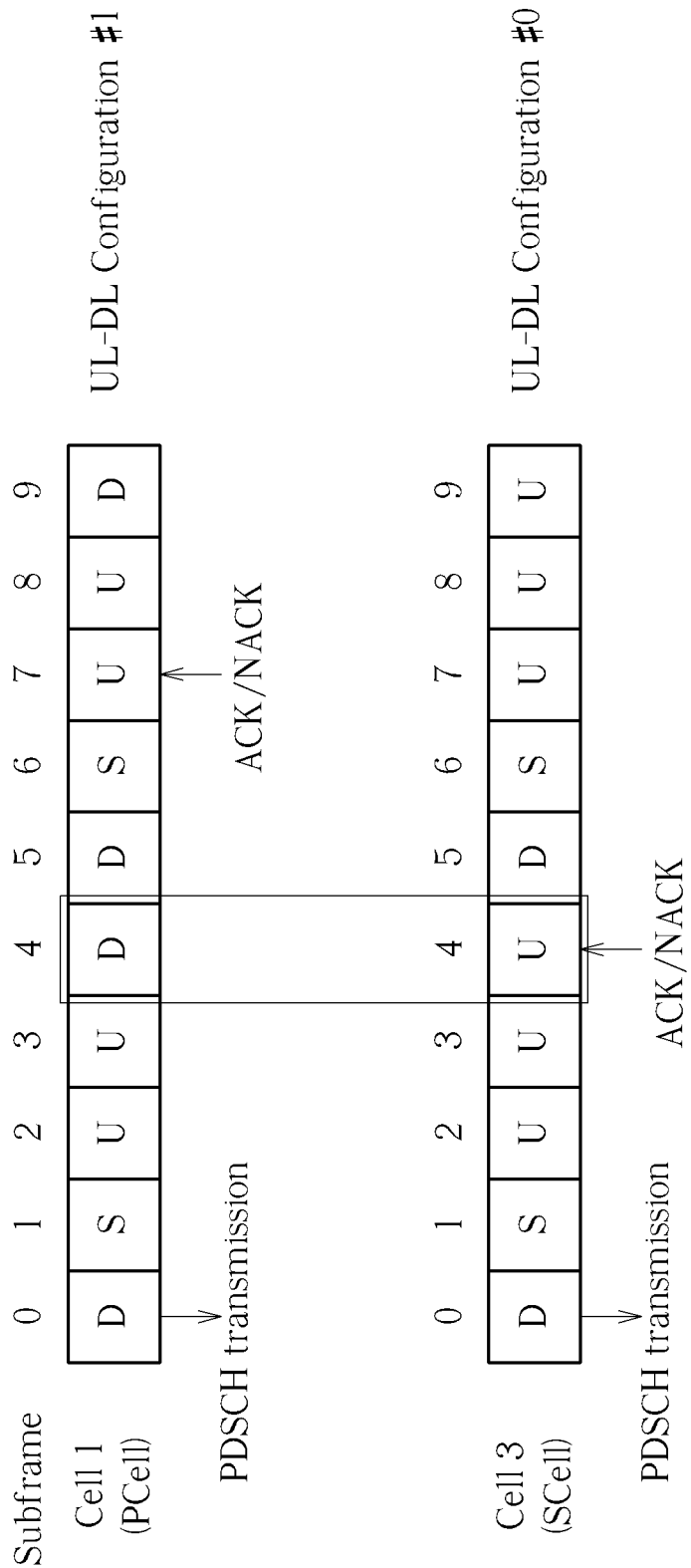
FIG. 2 is a schematic diagram of uplink control information transmission on cells with different UL-DL configurations according to the prior art.
Figure 3:
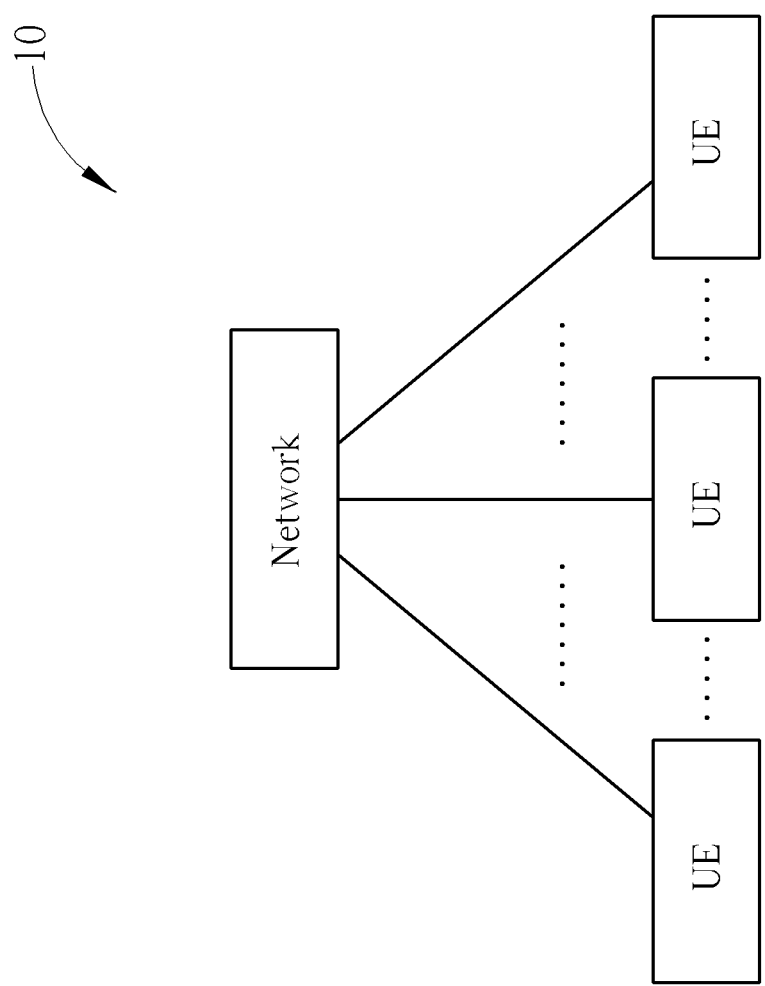
FIG. 3 is a schematic diagram of an exemplary wireless communication system according to the present disclosure.

Please refer to FIG. 3, which is a schematic diagram of a wireless communication system 10 according to an example of the present disclosure. The wireless communication system 10, such as a long term evolution-advanced (LTE-A) system or other mobile communication systems supporting a carrier aggregation (CA), is briefly composed of a network and a plurality of user equipments (UEs). In FIG. 3, the network and the UEs are simply utilized for illustrating the structure of the wireless communication system 10. Practically, the network can be referred as to an E-UTRAN (evolved-UTAN) comprising a plurality of evolved Node-Bs (eNBs) and relays in the LTE-A system. The UEs can be mobile devices such as mobile phones, laptops, tablet computers, electronic books, and portable computer systems, a camera, a television, a hand-held video game device, a musical device, a wireless sensor, etc. In some applications, a UE may be a fixed computing device operating in a mobile environment, such as a bus, a train, an airplane, a boat, a car, etc. Besides, the network and the UE can be seen as a transmitter or receiver according to transmission direction, e.g., for an uplink (UL), the UE is the transmitter and the network is the receiver, and for a downlink (DL), the network is the transmitter and the UE is the receiver.

Figure 4:
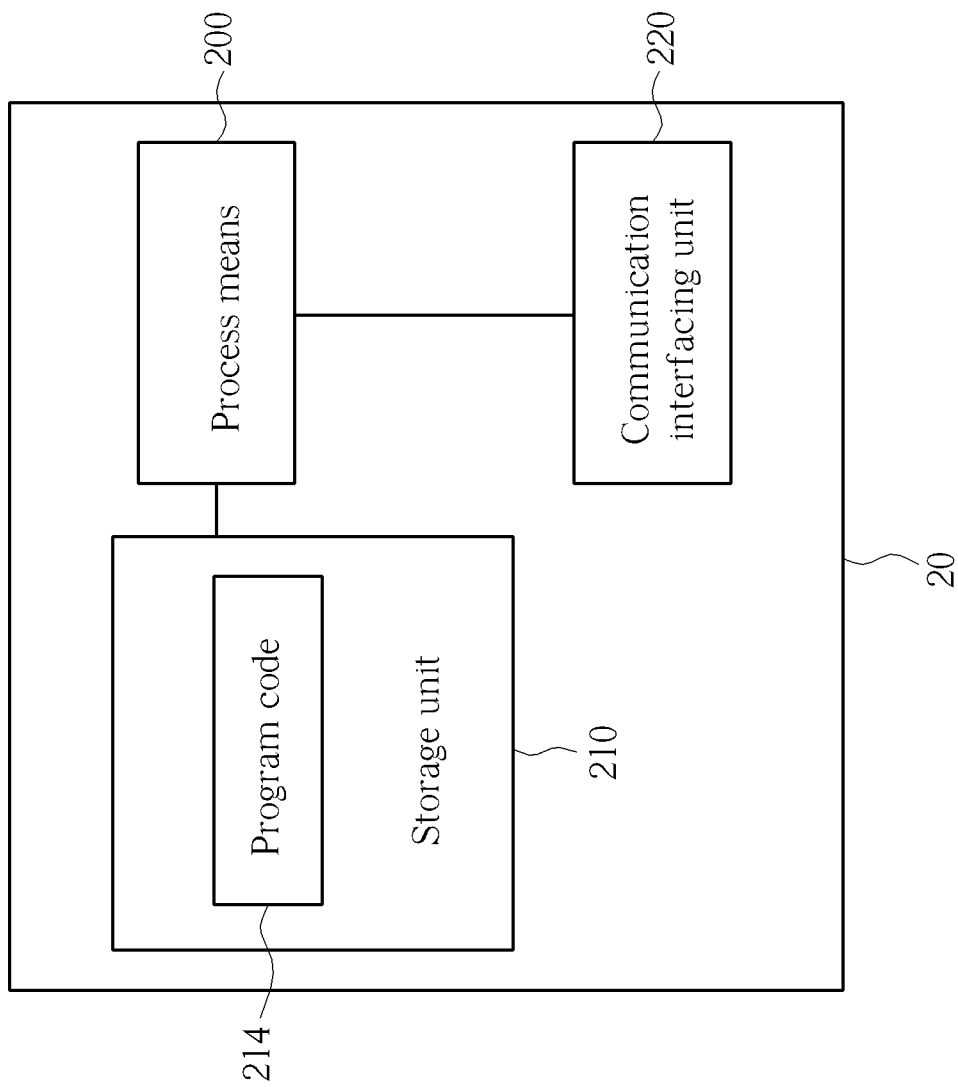
FIG. 4 is a schematic diagram of an exemplary communication device according to the present disclosure.

Please refer to FIG. 4, which is a schematic diagram of a communication device 20 according to an example of the present disclosure. The communication device 20 can be the UE or the network shown in FIG. 3, but is not limited herein. The communication device 20 may include a processor 200 such as a microprocessor or Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver and can exchange wireless signals with the network according to processing results of the processor 200.

Figure 5:
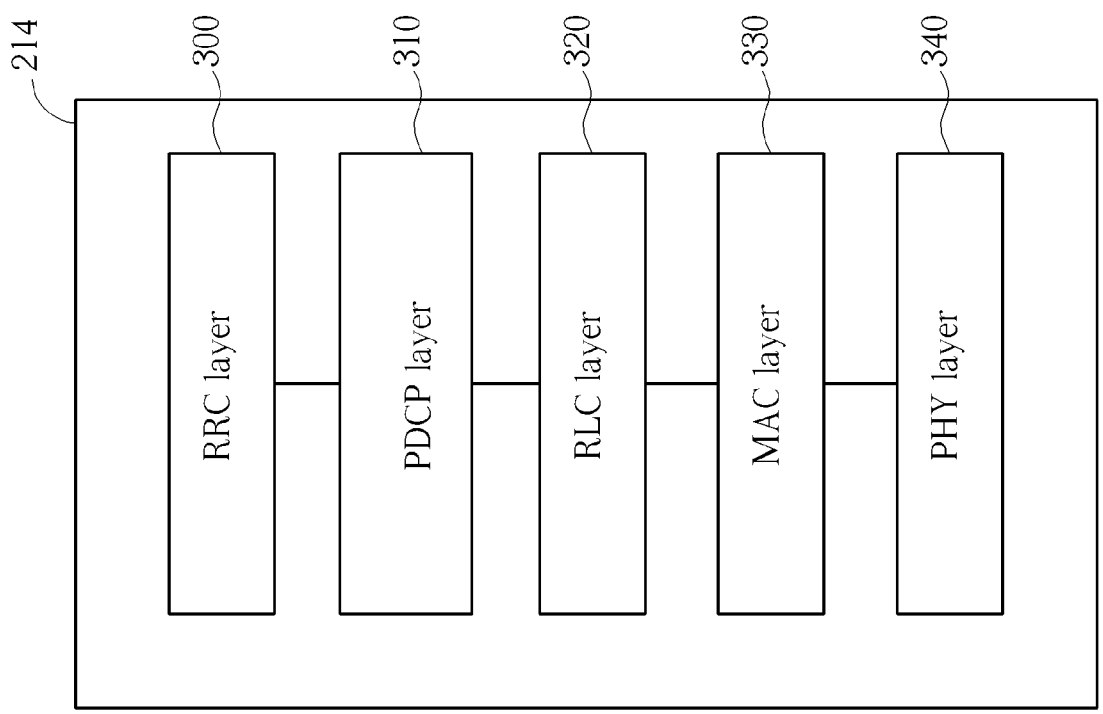
FIG. 5 is a schematic diagram of communication protocol layers for an exemplary wireless communication system.

Please refer to FIG. 5, which illustrates a schematic diagram of communication protocol layers for the LTE-Advanced system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340. The PHY layer 340 is used to provide physical channels, e.g. a physical uplink control channel (PUCCH) and a physical uplink shared channel (PUSCH), such that uplink control information and data can be transmitted to the network. The uplink control information may be acknowledgement/negative acknowledgement (ACK/NACK) feedback, a channel quality indicator (CQI) report, a precoding matrix indicator (PMI) report, a rank indicator (RI) report, a precoding type indicator (PTI), channel state information (CSI), and scheduling request (SR), etc.

Figure 6:
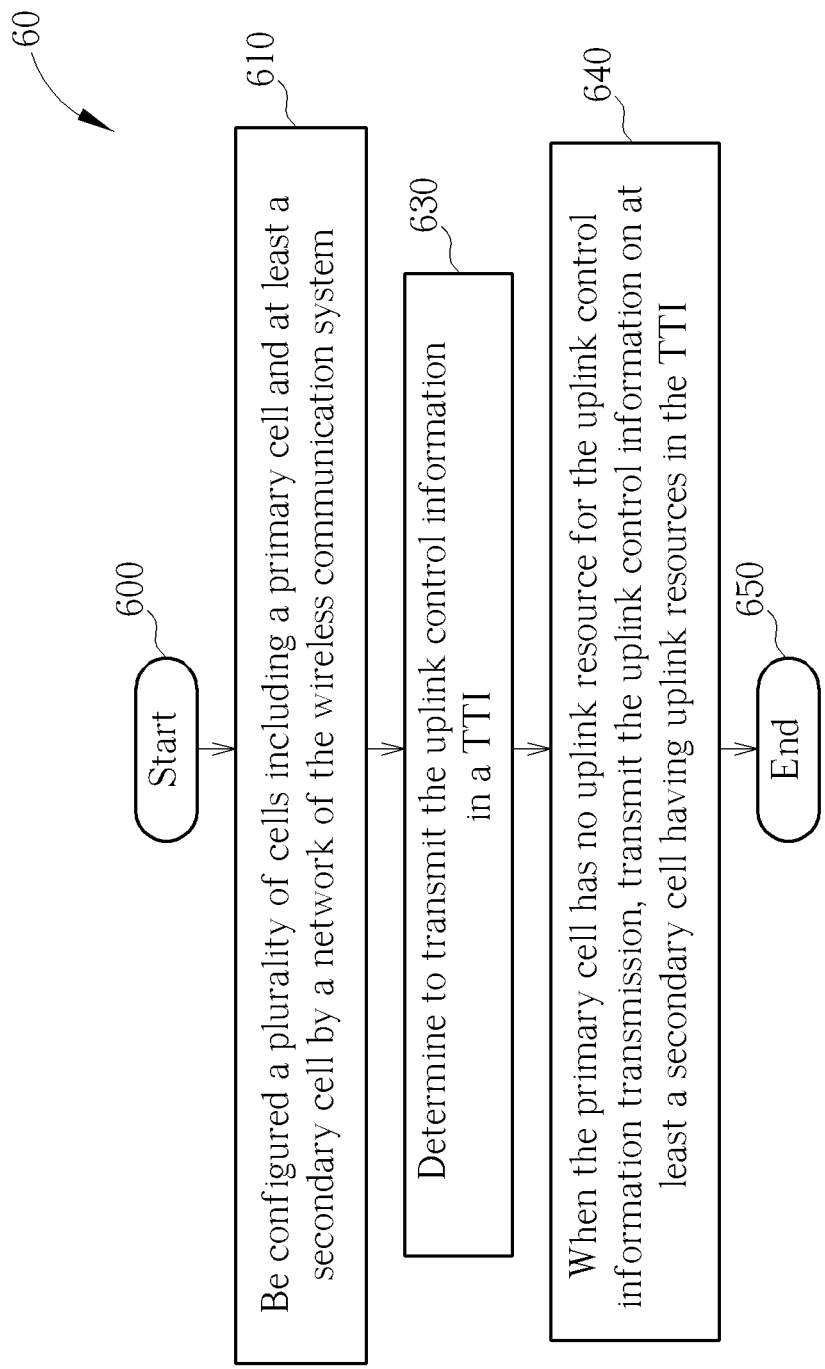
FIG. 6 is a flowchart of an exemplary process according to the present disclosure.

Please refer to FIG. 6, which is a flowchart of a process 60 according to an example of the present disclosure. The process 60 is utilized in a UE of the wireless communication system 10 shown in FIG. 3, to handle a uplink control information transmission. The process 60 may be compiled into the program code 214 and includes the following steps:

Step 600: Start.

Step 610: Be configured a plurality of cells including a primary cell and at least a secondary cell by a network of the wireless communication system.

Step 630: Determine to transmit the uplink control information in a TTI.

Step 640: When the primary cell has no uplink resource for the uplink control information transmission, transmit the uplink control information on at least a secondary cell having uplink resources in the TTI.

Step 650: End.

According to the process 60, a UE is allowed using a secondary cell to feedback the uplink control information. Therefore, when the UE needs to feedback uplink control information (e.g. ACK/NACK for the downlink assignment (i.e. PDSCH transmission) on the secondary cell in a subframe) on the primary cell in a transmission time interval (TTI), but the subframe on the primary cell is a downlink subframe, the UE switches to use a secondary cell for the uplink control information transmission. As a result, timing for uplink control Information feedbacks may not change.

In other words, the network configures uplink feedback resources (e.g. PUCCH configuration (PUCCH-Config, PUSCH-ConfigCommon, PUCCH-ConfigDedicated), UL grants, Semi-Persistent Scheduling configuration (SPS-Config), etc.) on a cell for a UE to feedback uplink control information (e.g. ACK/NACK, CQI, PMI, RI, PTI, CSI, SR, CSI-RS reporting). In some embodiments, the uplink feedback resources may be implicitly indicated by the downlink assignment in PDCCH. For example, PUCCH resource may be implicitly indicated based on the resource block index and/or demodulation reference signal (DMRS) of the downlink assignment.

In an embodiment, when UE needs to feedback uplink control information in a TTI, the UE may report it on one of the cells having uplink feedback resource. In detail, the UE may feedback the uplink control information on one of the cells, which are "PUSCH-available" and/or "PUCCH-available" for this TTI. Note that, a cell is PUSCH-available in this TTI if the UE is allowed to transmit PUSCH on the cell in this TTI. For example, a cell may be PUSCH-available in this TTI if the cell is activated, uplink synchronization for this cell is done or maintained, TimeAlignmentTimer for this UE or for this cell is running, the cell has uplink subframes (or uplink resources) in this TTI, and/or the UE is assigned with uplink grants on this cell for this TTI. In addition, a cell is PUCCH-available in this TTI if the UE is allowed to transmit on PUCCH on the cell in this TTI. For example, a cell may be PUCCH-available in this TTI if the cell is activated, uplink synchronization for this cell is done or maintained, TimeAlignmentTimer for this UE or for this cell is running, the cell has UL subframes (or UL resources) in this TTI, and/or the UE has (or has been configured with) PUCCH resources on the cell for this TTI. Besides, a cell is UL-available in this TTI, if the UE is allowed to transmit UL signal on the Cell in this TTI. For example, a cell may be UL-available in this TTI if the cell is PUCCH-available or PUSCH-available in this TTI.

For uplink control information transmission on one of the "PUSCH-available" and/or "PUCCH-available" cells, the UE may feedback the uplink control information on a cell with the highest priority among the "PUSCH-available" and/or "PUCCH-available" cells. In an embodiment, the priority of a cell may be assigned/configured to the UE when the cell is added (configured) by the network (e.g. eNodeB). In some embodiments, the priority of a cell may be ranked according to a cell index of a cell, a reporting type, a number of uplink subframes on a cell in a radio frame, an uplink grant assignment on a cell, a TDD UL-DL configuration index for a cell, or a channel condition on a cell.

As to the cell index, a cell having a smaller cell_index may have a higher priority. The PCell may always have the smallest cell_index (e.g. 0). As to the reporting type, a PUCCH reporting type (e.g. periodic CSI, aperiodic CSI, CQI/PMI/RI/PTI reporting type, reporting period) may be used to prioritize cells. For example, a cell for which the UE is triggered to report aperiodic CQI may have higher priority than another cell for which UE is triggered to report periodic CQI. As to the number of uplink subframes, a cell which is configured with more uplink subframes may have a higher priority. As to the uplink grant assignment, a cell which is assigned with uplink grant may have a higher priority. As to the channel condition, a cell having a better channel condition (e.g. CQI, PMI, RI, PTI, RSRP, RSRQ, BER, etc) may have a higher priority.

Figure 7:
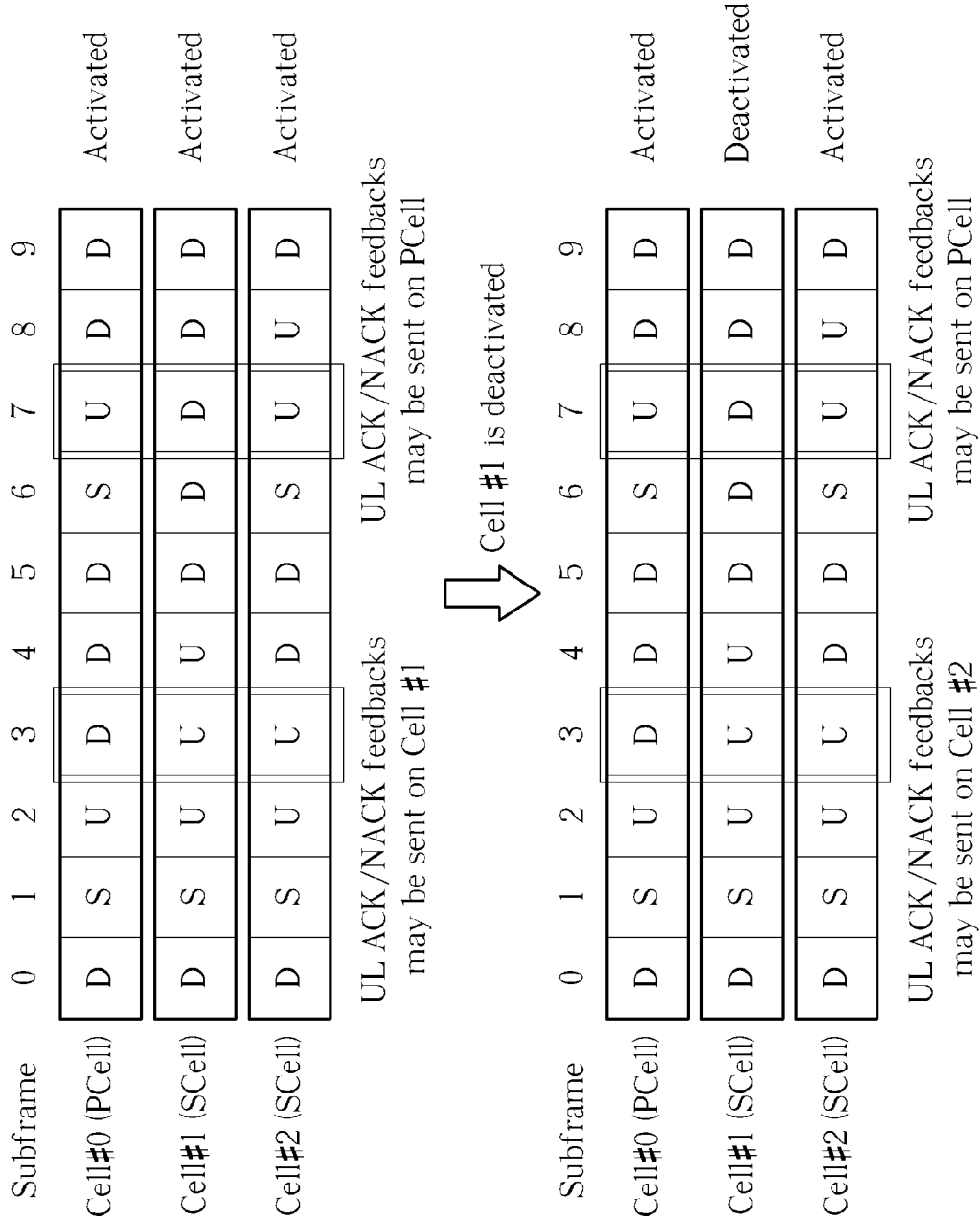

Please refer to FIG. 7, which is a schematic diagram of uplink control information transmission on a cell with the highest priority according to a first embodiment. In FIG. 7, the UE is configured with Cell#0 as a primary cell (PCell), and Cells#1-2 as secondary cells (SCell). In addition, the Cells#0-2 are activated, and are configured with different TDD UL-DL configurations. Assume the UE needs to feedback ACK/NACK in subframes '3' and '7'. In the subframe '3', the Cell#0 is not PUCCH-available or PUSCH available since the subframe '3' is a downlink subframe, whereas the Cells#1-2 may be PUCCH-available and/or PUSCH available. In this situation, the UE feedbacks ACK/NACK in the subframe '3' on the Cell#1, which has smallest cell_index among i.e. the Cells#1-2. Similarly, in subframe '7', the Cell#1 is not PUCCH-available and/or PUSCH available since the subframe '7' is a downlink subframe, whereas the Cell#0 and Cell#2 may be PUCCH-available or PUSCH available. In this situation, the UE feedbacks ACK/NACK in the subframe '7' on Cell#0, which has smallest cell_index among the Cell#0 and Cell#2. On the other hand, if a cell (i.e. Cell#1) is deactivated (namely it may be not PUCCH-available and/or PUSCH-available), the UE feedbacks ACK/NACK in the subframe '3' on Cell#2, and in subframe '7' on Cell#0.

Note that, in FIG. 7, a cell index of a cell is used to prioritize cells. However, the UE may utilize reporting type, a number of uplink subframes on a cell in a radio frame, an uplink grant assignment on a cell, a TDD UL-DL configuration index for a cell, or a channel condition on a cell to prioritize the cells. In addition, the ACK/NACK feedback is only used for illustration of uplink control information transmission, and is not limited herein. In other words, the concept of transmitting the uplink control information on a cell with highest priority can be used for CQI, PMI, RI, PTI, CSI, CSI-RS reporting, SR, etc.

Figure 8:
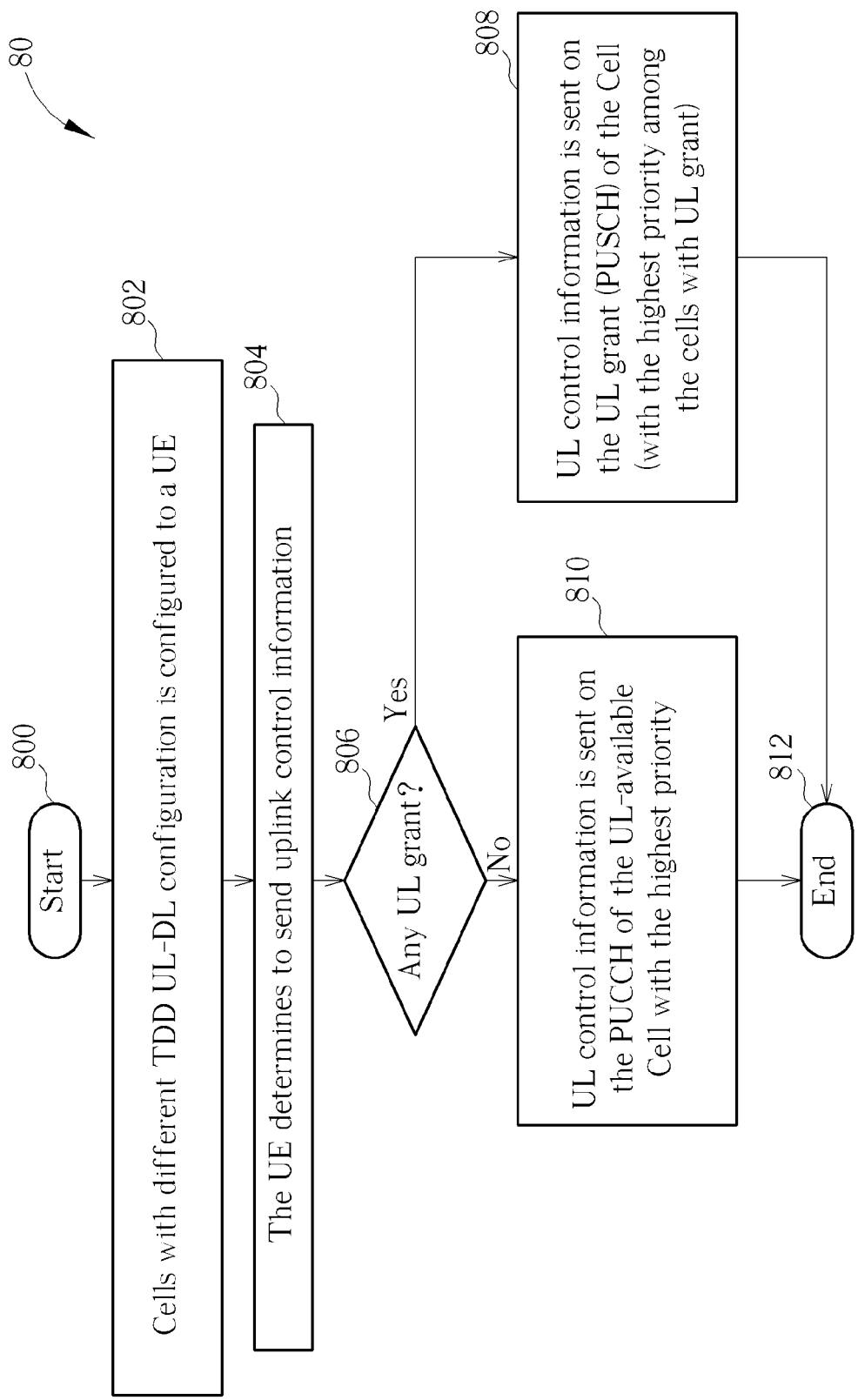

Please refer to FIG. 8, which is a schematic diagram of uplink control information transmission on a cell with the highest priority according to a second embodiment. A UE is configured of cells with different TDD UL-DL configurations, and determines to send uplink control information in a TTI (steps 802-804). The UE checks whether an uplink grant is allocated for any of the UL-available cells for this TTI (step 806). If there is an uplink grant allocated for cells, the UE transmit the uplink control information on the uplink grant (namely on the PUSCH) of a cell with highest priority (e.g. the smallest cell_index) among the cells with uplink grant (step 808). However, if there is no uplink grant for any of the UL-available cells. The UE transmit the uplink control information on the PUCCH of a cell with the highest priority among the PUCCH-available cells (step 810).

Figure 9:
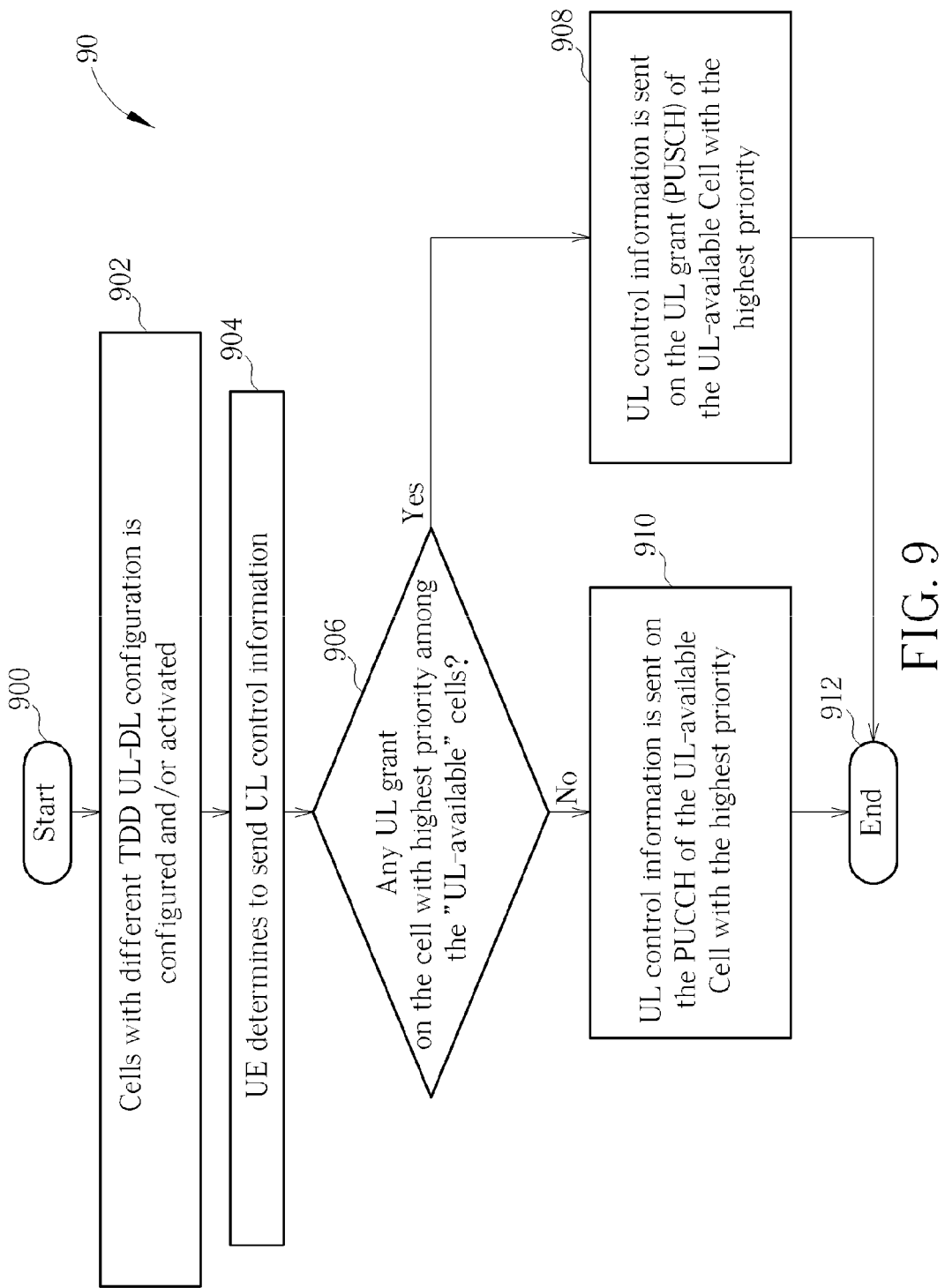

Please refer to FIG. 9, which is a schematic diagram of uplink control information transmission on a cell with the highest priority according to a third embodiment. A UE is configured of cells with different TDD UL-DL configurations, and determines to send uplink control information in a TTI (steps 902-904). The UE checks whether an uplink grant is allocated for a cell with the highest priority (e.g. the smallest cell_index) among the UL-available cells for this TTI (step 906). If there is an uplink grant allocated for the cell with the highest priority among the UL-available cells, the UE transmits the uplink control information on the uplink grant (namely on the PUSCH) of the cell with highest priority among the UL-available cells (step 908). However, if there is no uplink grant for the cell with highest priority among the UL-available cells, the UE transmit the uplink control information on the PUCCH of the cell with the highest priority among the UL-available cells (step 910). Note that, the difference between the second embodiment and the third embodiment is that the UE checks whether the uplink grant is allocated for the highest priority cell among the UL-available cells in the third embodiment, rather than for any of the UL-available cells.

Figure 10:
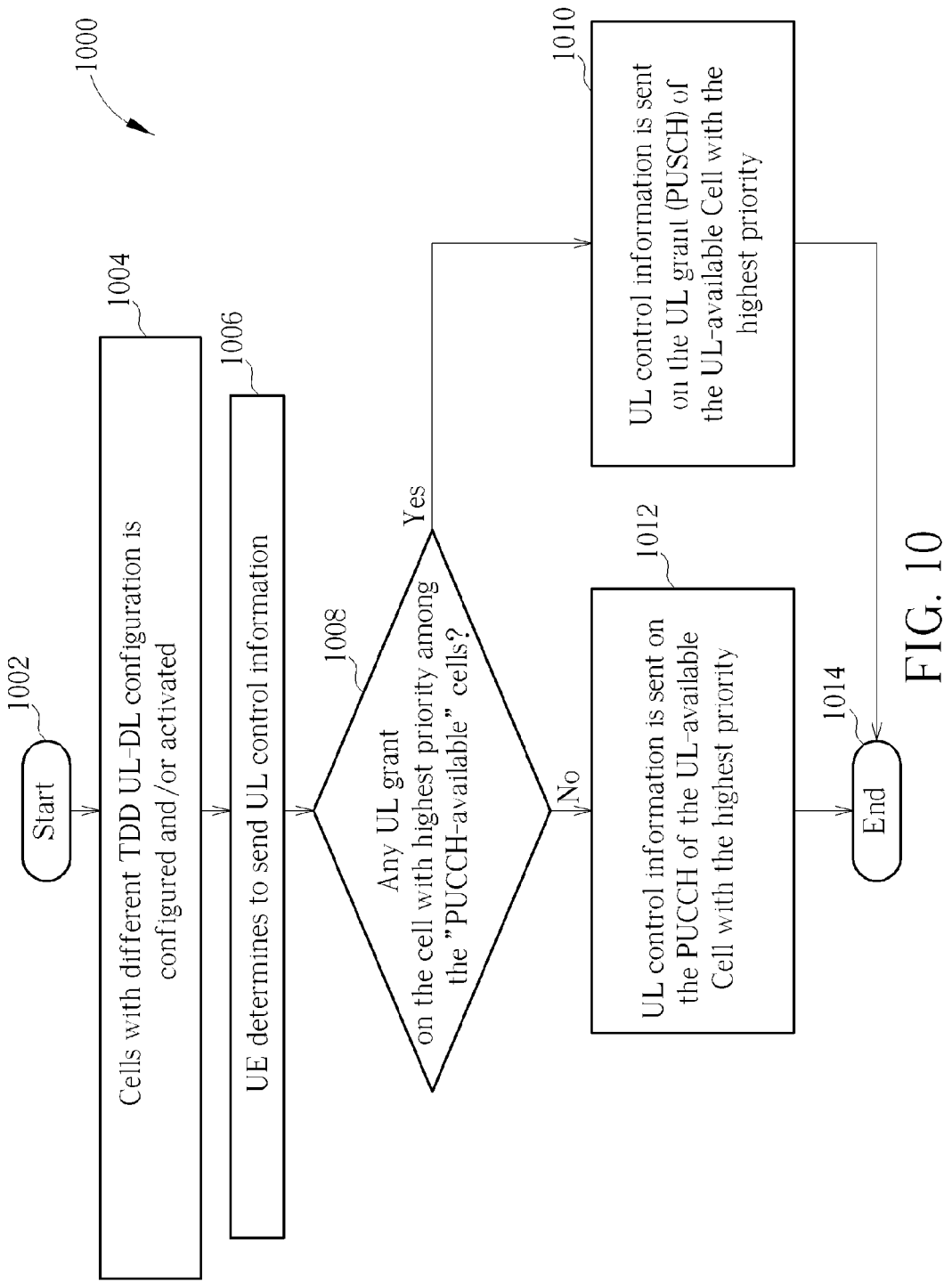

Please refer to FIG. 10, which is a schematic diagram of uplink control information transmission on a cell with the highest priority according to a fourth embodiment. A UE is configured of cells with different TDD UL-DL configurations, and determines to send uplink control information in a TTI (steps 1004-1006). The UE checks whether an uplink grant is allocated for a cell with the highest priority (e.g. the smallest cell_index) among the PUCCH-available cells for this TTI (step 1008). If there is an uplink grant allocated for the cell with the highest priority among the PUCCH available cells, the UE transmits the uplink control information on the uplink grant (namely on the PUSCH) of the cell with highest priority among the PUCCH available cells (step 1010). However, if there is no uplink grant for the cell with highest priority among the PUCCH-available cells, the UE transmit the uplink control information on the PUCCH of the cell with the highest priority among the PUCCH-available cells (step 1012). Note that, the difference between the third embodiment and the fourth embodiment is that the UE checks whether the uplink grant is allocated for the highest priority cell among the PUCCH-available cells in the fourth embodiment, rather than among the UL-available cells.

Figure 11:
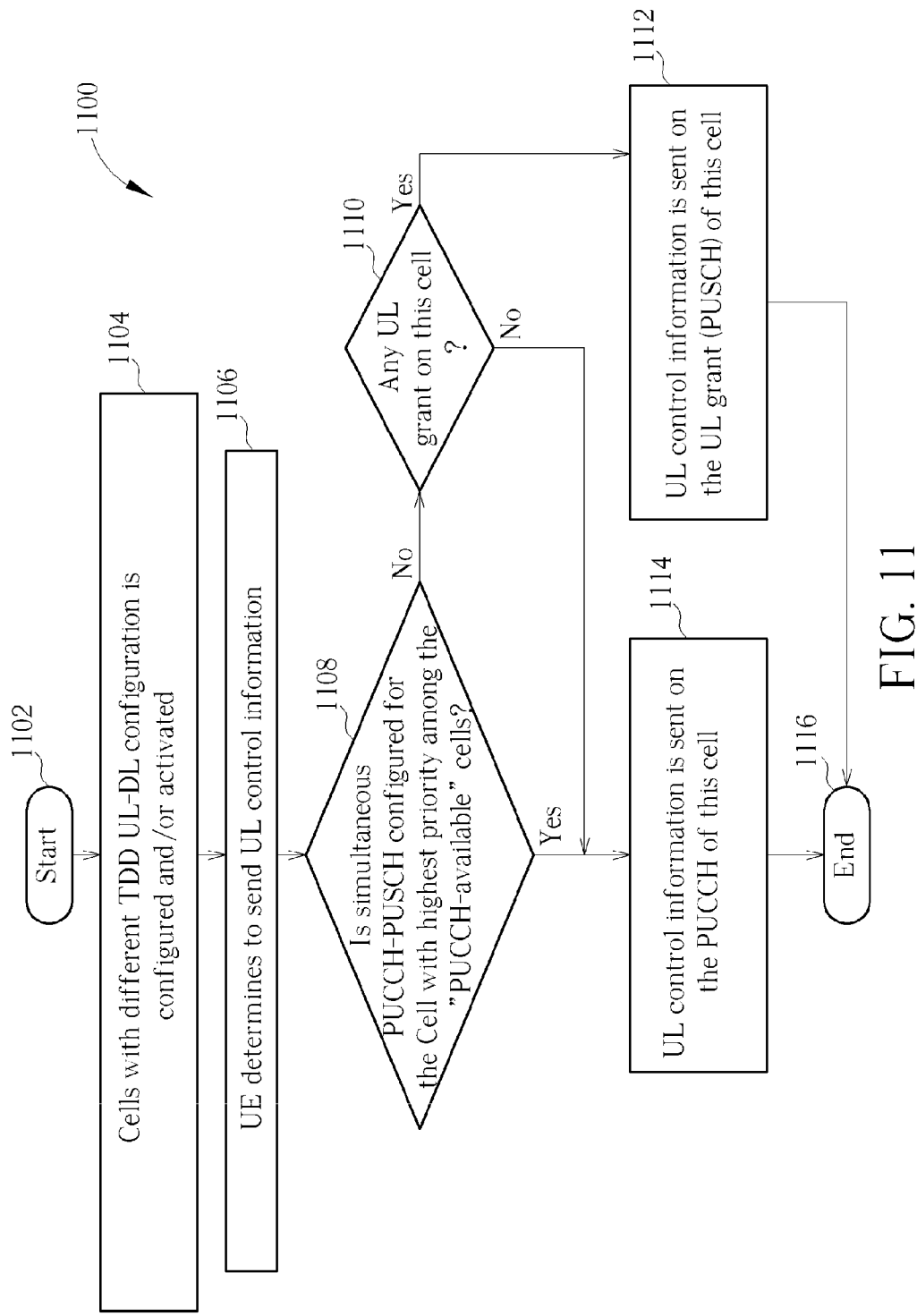

Please refer to FIG. 11, which is a schematic diagram of uplink control information transmission on a cell with the highest priority according to a fifth embodiment. A UE is configured of cells with different TDD UL-DL configurations, and determines to send uplink control information in a TTI (steps 1104-1106). The UE checks whether a simultaneous PUCCH-PUSCH transmission is configured (or allowed) for a cell with the highest priority (e.g. the smallest cell_index) among the PUCCH-available cells for this TTI (step 1108). If the simultaneous PUCCH-PUSCH transmission is configured for the cell with the highest priority among the PUCCH available cells, the UE transmits the uplink control information on the PUCCH of the cell with highest priority among the PUCCH available cells (step 1114). However, if the simultaneous PUCCH-PUSCH transmission is not configured for the cell with highest priority among the PUCCH-available cells, the UE further checks whether an uplink grant is on the cell with the highest priority among the PUCCH-available cells (step 1110). If the uplink grant is on the cell with the highest priority among the PUCCH-available cells, the UE transmits the uplink control information on the uplink grant (namely on the PUSCH) of the cell with the highest priority among the PUCCH-available cells (step 1112). On the other hand, if the uplink grant is not on the cell with the highest priority among the PUCCH-available cells, the UE transmits the uplink control information on the PUCCH of the cell with highest priority among the PUCCH-available cells (step 1114).

Figure 12:
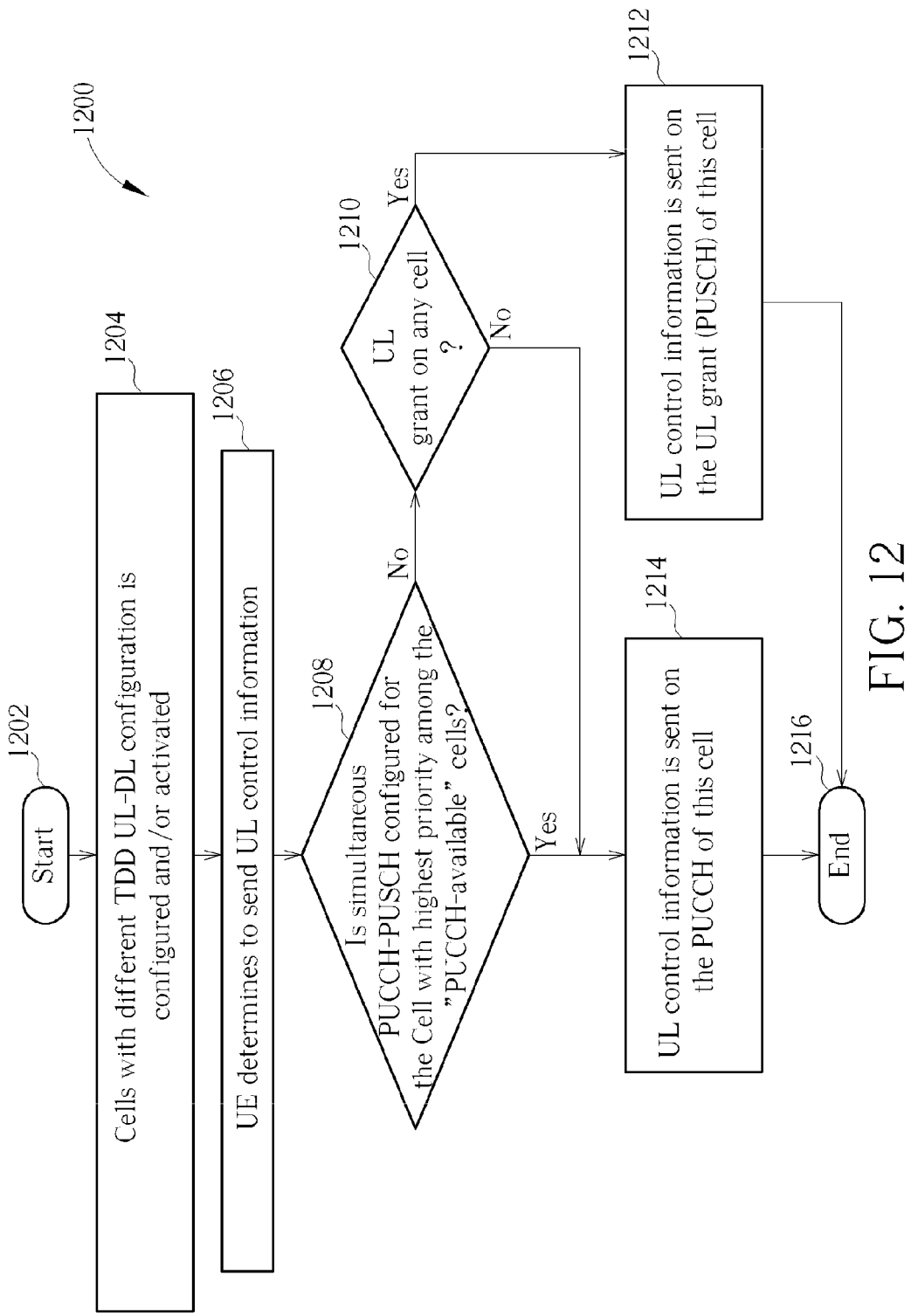

Please refer to FIG. 12, which is a schematic diagram of uplink control information transmission on a cell with the highest priority according to a sixth embodiment. A UE is configured of cells with different TDD UL-DL configurations, and determines to send uplink control information in a TTI (steps 1204-1206). The UE checks whether a simultaneous PUCCH-PUSCH transmission is configured for a cell with the highest priority (e.g. the smallest cell_index) among the PUCCH-available cells for this TTI (step 1208). If the simultaneous PUCCH-PUSCH transmission is configured for the cell with the highest priority among the PUCCH available cells, the UE transmits the uplink control information on the PUCCH of the cell with highest priority among the PUCCH available cells (step 1212). However, if the simultaneous PUCCH-PUSCH transmission is not allocated for the cell with highest priority among the PUCCH-available cells, the UE further checks whether an uplink grant is on any of the UL-available cells (step 1210). If the uplink grant is allocated on the cells, the UE transmits the uplink control information on the uplink grant (namely on the PUSCH) of a cell with the highest priority among the cells with the uplink grant (step 1214). On the other hand, if the uplink grant is not on any of the UL-available cells, the UE transmits the uplink control information on the PUCCH of the cell with highest priority among the PUCCH-available cells (step 1212).

Figure 13:
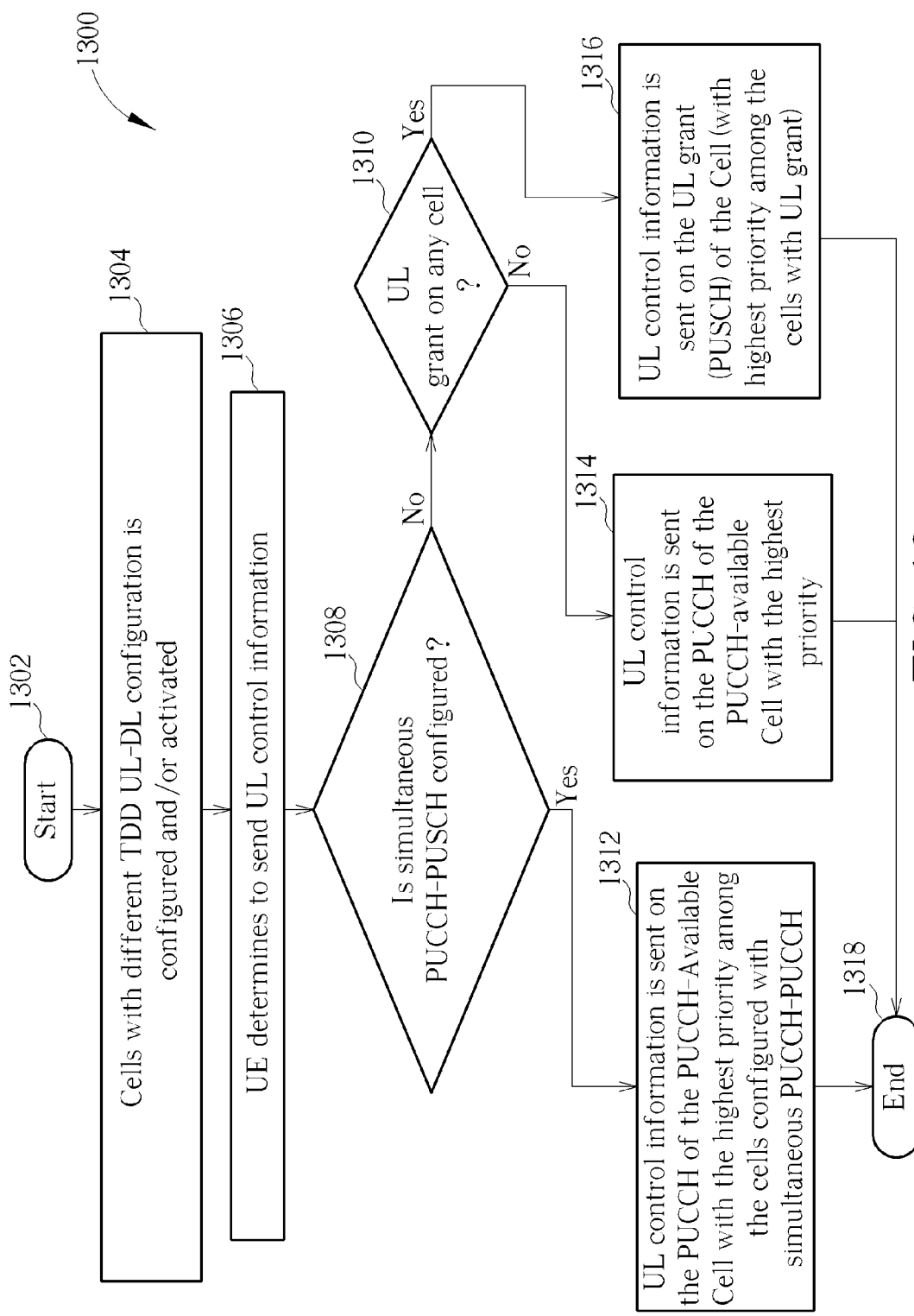

Please refer to FIG. 13, which is a schematic diagram of uplink control information transmission on a cell with the highest priority according to a seventh embodiment. A UE is configured of cells with different TDD UL-DL configurations, and determines to send uplink control information in a TTI (steps 1304-1306). The UE checks whether a simultaneous PUCCH-PUSCH transmission is configured or allowed for any of the PUCCH-available cells for this TTI (step 1308). If the simultaneous PUCCH-PUSCH transmission is configured for any of the PUCCH-available cells, the UE transmits the uplink control information on the PUCCH of a cell with highest priority (e.g. the smallest cell_index) among the PUCCH available cells (step 1312). However, if the simultaneous PUCCH-PUSCH transmission is not configured, the UE further checks whether an uplink grant is on any of the UL-available cells (step 1310). If the uplink grant is allocated, the UE transmits the uplink control information on the uplink grant (namely on the PUSCH) of a cell with the highest priority among the cells with the uplink grant (step 1316). On the other hand, if the uplink grant is not on any of the UL-available cells, the UE transmits the uplink control information on the PUCCH of the cell with highest priority among the PUCCH-available cells (step 1314).

Figure 14:
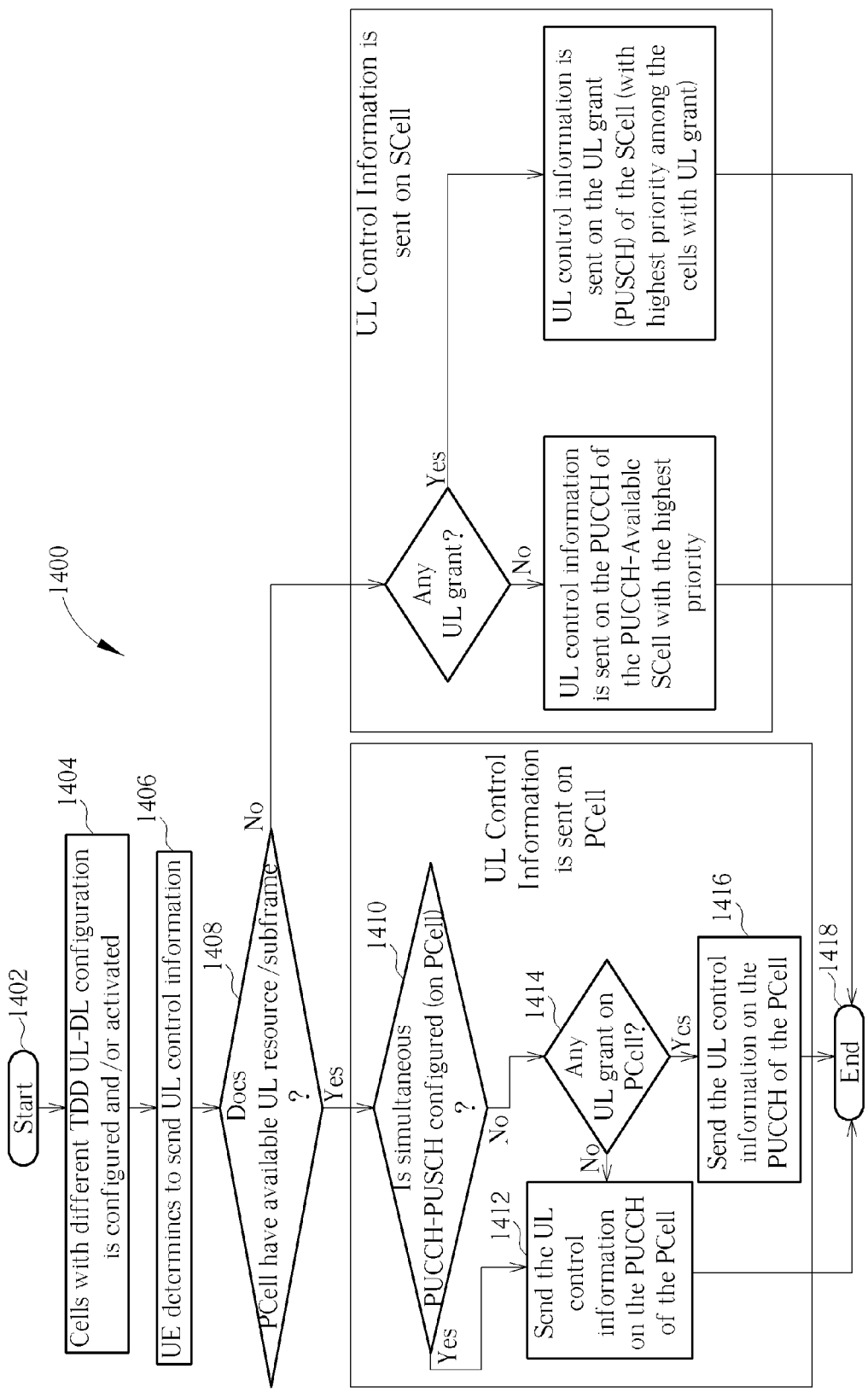

Please refer to FIG. 14, which is a schematic diagram of uplink control information transmission on a cell with the highest priority according to an eighth embodiment. A UE is configured of cells (including a PCell and at least a SCell) with different TDD UL-DL configurations, and determines to send uplink control information in a TTI (steps 1404-1406). The UE first checks whether the PCell has available uplink resource for this TTI (step 1408). If the PCell has available uplink resource for this TTI, the UE further checks whether a simultaneous PUCCH-PUSCH transmission is configured on the PCell (step 1410). If the simultaneous PUCCH-PUSCH transmission is configured on the PCell, the UE transmits the uplink control information on the PUCCH of the PCell (step 1412). However, if the simultaneous PUCCH-PUSCH transmission is not configured on the PCell, the UE further checks whether an uplink grant is on PCell (step 1414). If the uplink grant is on the PCell, the UE transmits the uplink control information on the uplink grant (namely on the PUSCH) of the PCell (step 1416). On the other hand, if the uplink grant is not on the PCell, the UE transmits the uplink control information on the PUCCH of the PCell (step 1412). Note that, if the PCell has no uplink resource for this TTI, the UE determines to transmit the uplink control information on a SCell as taught in the first to seventh embodiments. In FIG. 14, the UE uses the embodiment shown in FIG. 8 for the uplink control information transmission on the Scell. The detail description can be referred from above, so it is not given herein.

Figure 15:
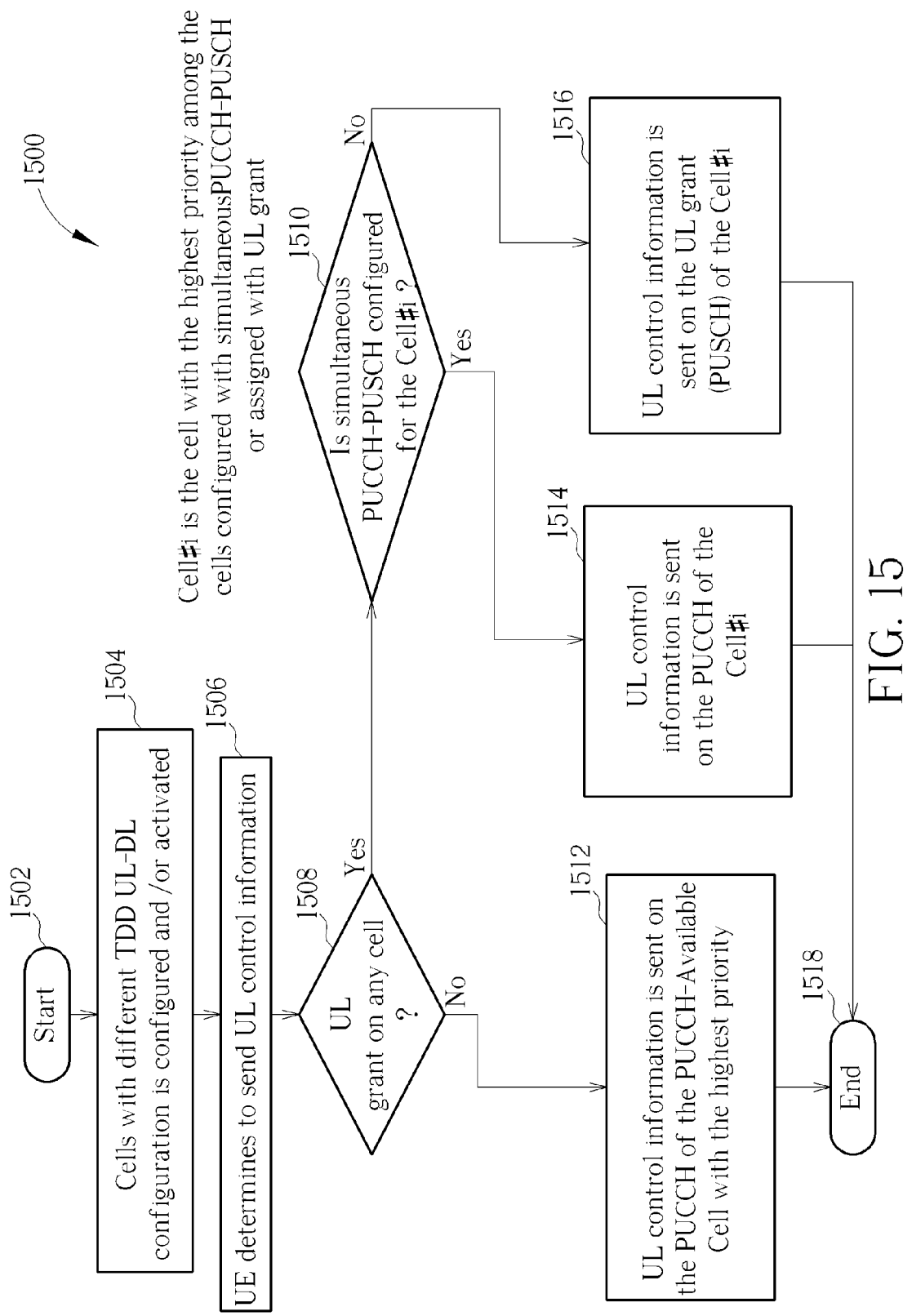

Please refer to FIG. 15, which is a schematic diagram of uplink control information transmission on a cell with the highest priority according to a ninth embodiment. Unlike the fifth embodiment, the UE first checks whether an uplink grant is allocated on any of the UL-available cells. If the uplink grant is not allocated on any of the UL-available cells, the UE transmits the uplink control information on the PUCCH of a cell with the highest priority among the PUCCH-available cells. On the other hand, if the uplink grant is allocated on cells, the UE further checks whether a simultaneous PUCCH-PUSCH transmission is configured for a cell with the highest priority among the cells with the uplink grant. If the simultaneous PUCCH-PUSCH transmission is configured for the cell with the highest priority among the cells with the uplink grant, the UE transmits the uplink control information on the PUCCH of the cell with the highest priority among the cells with the uplink grant. However, if the simultaneous PUCCH-PUSCH transmission is not configured for the cell with the highest priority among the cells with the uplink grant, the UE transmits the uplink control information on the uplink grant (namely on the PUSCH) of the cell with the highest priority among the cells with the uplink grant.

Note that, this disclosure may use the term that the uplink control information is transmitted on the uplink grant (namely on the PUSCH). However, for different kinds of uplink control information, the UE may use different methods to transmit it on the PUSCH. For example, if the uplink control information is ACK/NACK feedback(s), ACK/NACK may be punctured into data resources at locations around the DM-RS (SC-FDMA) symbols. On the other hand, if the uplink control information is CQI (or PMI, RI, PTI, CSI) report, it may be multiplexed with data.

Figure 16:
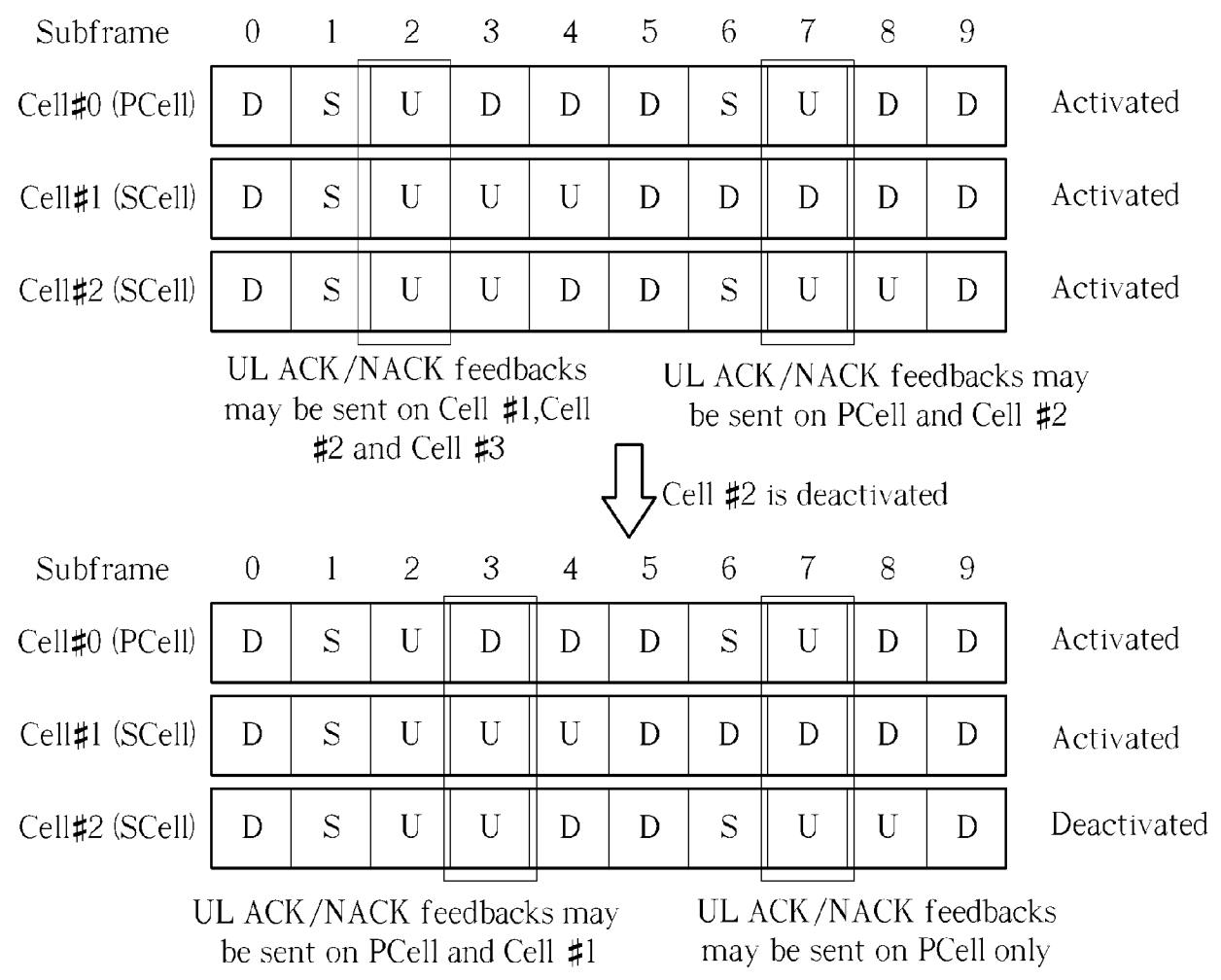

Alternatively, when UE needs to feedback uplink control information in a TTI, the UE may report it on all of the cells having uplink feedback resources. In detail, please refer to FIG. 16, which is a schematic diagram of uplink control information transmission on all of PUCCH-available and/or PUSCH-available cells. In FIG. 16, the UE is configured with Cell#0 as the PCell, and Cells#1-2 as the SCells. In addition, the Cells#0-2 are activated and are configured with different TDD UL-DL configurations. Assume the UE needs to transmit the uplink control information (e.g. ACK/NACK feedback) in subframes '3' and '7'. In the subframe '3', the Cells#0-3 are PUCCH-available and/or PUSCH available, and thus the UE transmits the ACK/NACK feedbacks on the Cells#0-3. In the subframe '7' the Cell#0 and Cell#2 are PUCCH-available and/or PUSCH available, and thus the UE transmits ACK/NACK feedbacks on Cell#0 and Cell#2. On the other hand, if the Cell#2 is deactivated, the UE feedbacks ACK/NACK in the subframe '3' on Cells#0-1, and in subframe '7' on Cell#0 only. In addition, the UE may feedback duplicate or non-duplicate UL control information on the PUCCH-available and/or PUSCH-available cells.

Note that, in this embodiment, the number of cells for sending the uplink control information may be different in different TTIs. Besides, in this embodiment, CA with different TDD UL-DL configuration is illustrated. But the same idea could be applied to the same UL-DL configuration or FDD system.

Or, when UE needs to feedback uplink control information in a TTI, the UE may report it on a subset of the cells having uplink feedback resources. In an embodiment, different uplink control information may have different priority rule. For example, for ACK/NACK feedbacks, cells with smaller cell_index may have higher priority, but for aperiodic CQI reporting, cell which is triggered to report the aperiodic CQI may have a higher priority. In detail, please refer to FIG. 17, which is a schematic diagram of uplink control information transmission on a subset of PUCCH-available and/or PUSCH-available cells. In FIG. 17, the UE is configured with Cell#0 as the PCell, and Cells#1-2 as the SCells. In addition, the Cells#0-2 are activated and are configured with different TDD UL-DL configurations. Assume the UE needs to transmit the uplink control information (e.g. ACK/NACK feedback and aperiodic CQI reporting) in subframe '3'. In the subframe '3', the Cells#1-2 are PUCCH-available and/or PUSCH available, and the UE transmits the ACK/NACK feedbacks on the Cell#1 and the aperiodic CQI reporting on the Cell#2.

Figure 18:
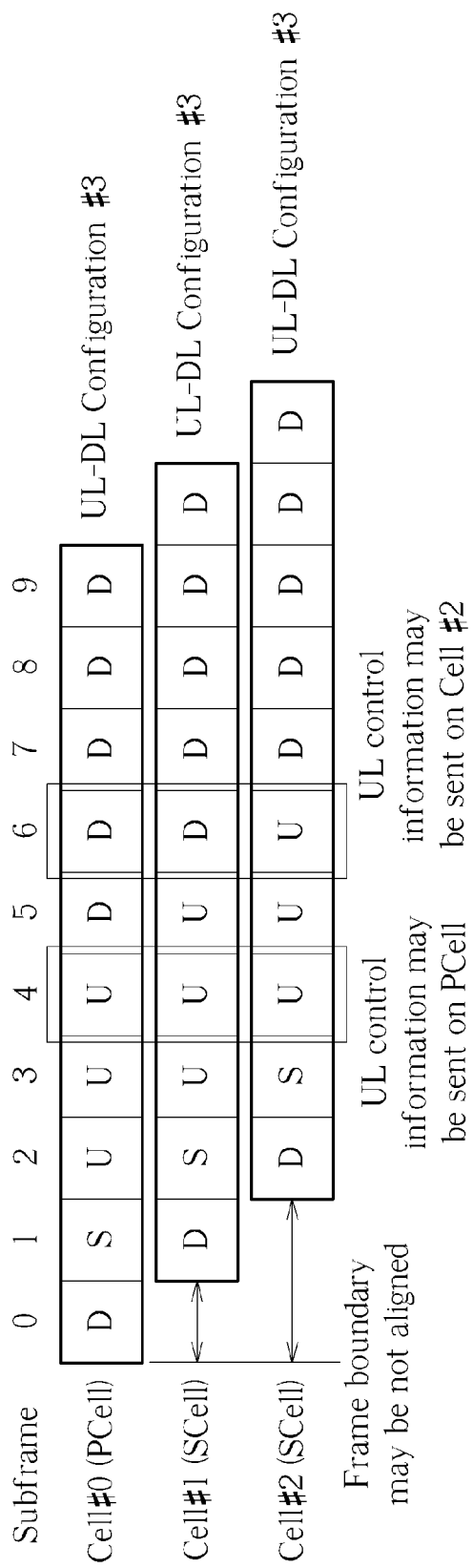
FIG. 18 is a schematic diagram of cells without frame timing synchronization.

Note that, the abovementioned embodiments could be used not only for CA with different TDD UL-DL configurations, but also for CA with the same TDD UL-DL configuration. Please refer to FIG. 18, which illustrates cells without frame timing synchronization. The frame boundary between aggregated cells is not aligned or synchronized. In this embodiment, when the UE needs to report the uplink control information in a TTI, the UE may report it on at least one of the cells having uplink resources. Moreover, the UE may report it on one cell with the highest priority (i.e. the smallest cell_index).

Further, the abovementioned embodiments could be used not only for TDD system but FDD system. Please refer to FIG. 19, which illustrates cells with FDD system and TDD system. In FIG. 19, the UE is configured with two Cells#0-1. The PCell of the UE is a FDD system, and the SCell of the UE is a TDD system. Again, if the PCell is TDD system and SCell is FDD system, the proposed methods still can be applied. In some TTIs, the UE may feedback uplink control information on the PCell only, because the PCell always has uplink resource. In some TTIs, UE may feedback uplink control information on the SCell, for example, when an uplink grant is assigned on the SCell and no uplink grant is assigned on the PCell. In some cases, UE may feedback uplink control information on both PCell and SCell. For example, if an uplink grant is assigned on both PCell and SCell, and aperiodic CQI is triggered for the SCell, then UE may report ACK/NACK on the PUSCH of PCell and may report aperiodic CQI on the PUSCH of SCell.

Figure 20:
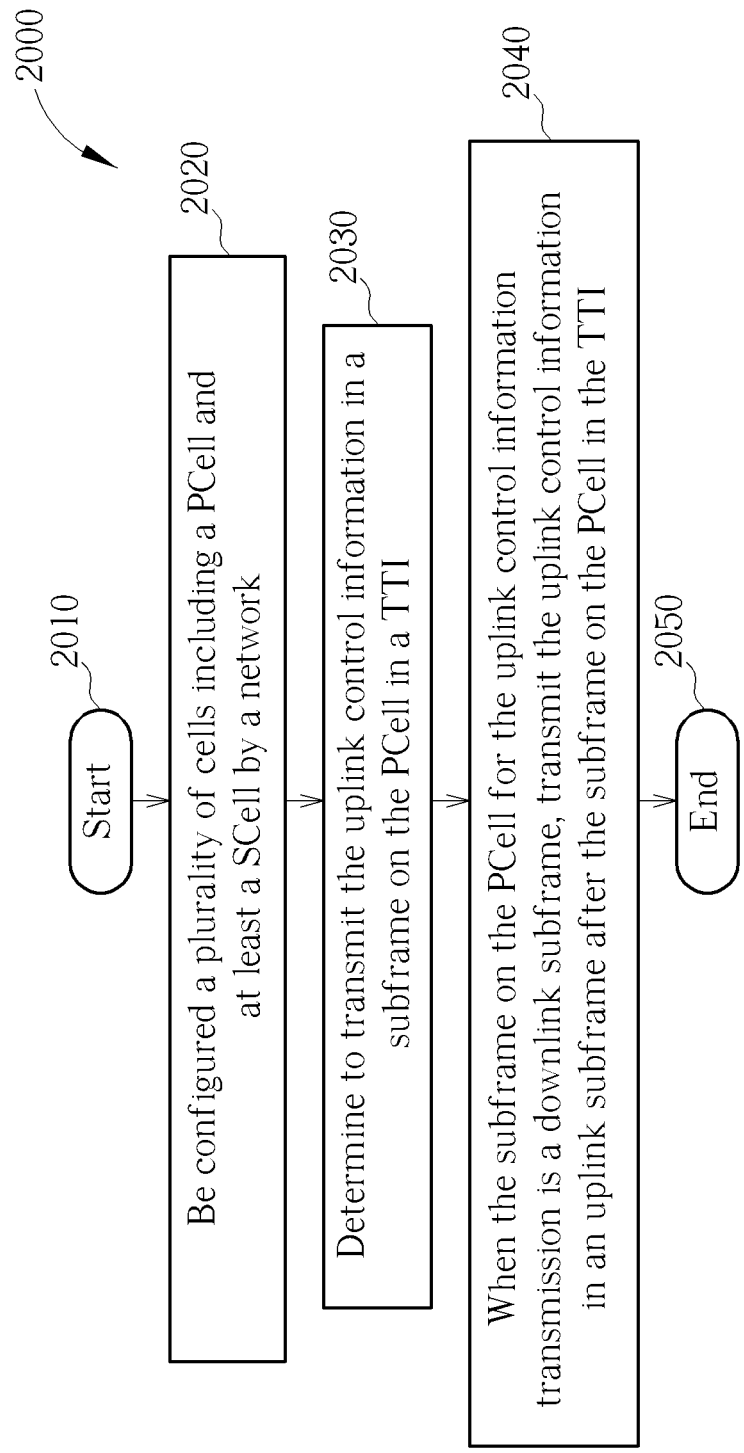
FIG. 20 is a flowchart of an exemplary process according to the present disclosure.

Please refer to FIG. 20, which is a flowchart of a process 2000 according to an example of the present disclosure. The process 2000 is utilized in a UE of the wireless communication system 10 shown in FIG. 3, to handle a uplink control information transmission. The process 2000 may be compiled into the program code 214 and includes the following steps:

Step 2010: Start.

Step 2020: Be configured a plurality of cells including a PCell and at least a SCell by a network.

Step 2030: Determine to transmit the uplink control information in a subframe on the PCell in a TTI.

Step 2040: When the subframe on the PCell for the uplink control information transmission is a downlink subframe, transmit the uplink control information in an uplink subframe after the subframe on the PCell in the TTI.

Step 2050: End.

According to the process 2000, the UE changes the timing to report the uplink control information (e.g. ACK/NACK, periodic/aperiodic CQI, PMI, RI, RI, CSI reporting, SR, etc.) on the PCell. For example, the UE may advance or delay the timing to report the uplink control information on the PCell.

Figure 21:
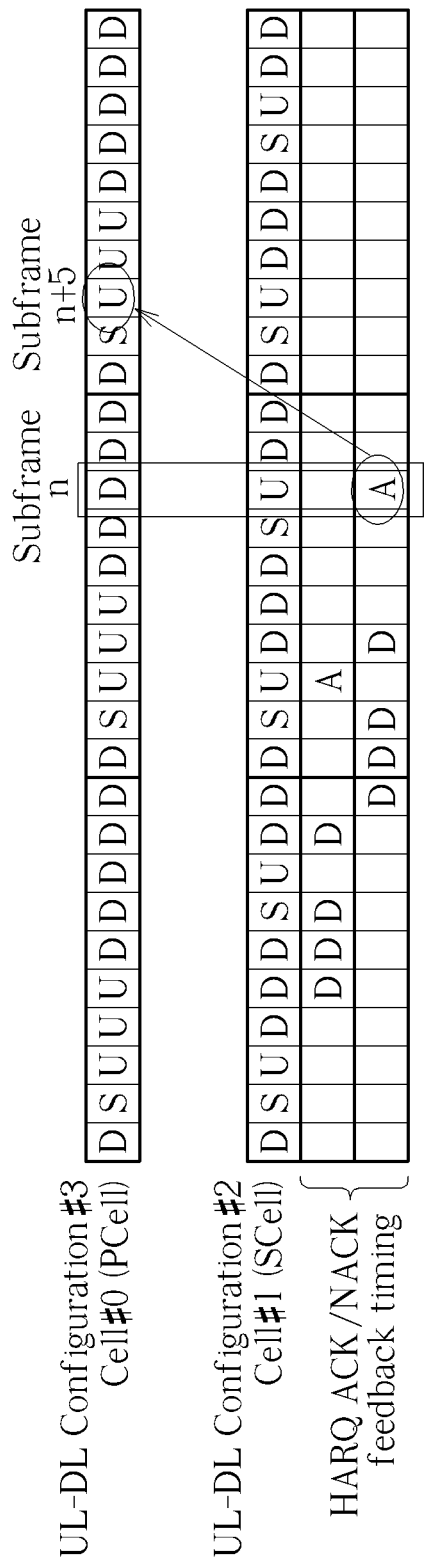
FIG. 21 is a schematic diagram of an uplink control information transmission timing on a primary cell according to the present disclosure.

In an embodiment, the UE delays the timing to report the uplink control information on the PCell until the time of the first available uplink subframe on the PCell. In the following embodiments, the uplink control information is ACK/NACK feedback. However, the uplink control information could be CQI, PMI, RI, PTI, CSI, and/or SR. Please refer to FIG. 21, which illustrates the uplink control information transmission timing on the PCell. In FIG. 21, the UE wants to send the ACK/NACK feedback for the SCell at the subframe n, which is a downlink subframe on the PCell. Thus, the ACK/NACK feedback is delayed until the subframe n+5, which is the first uplink subframe after the subframe n. In an embodiment, the ACK/NACK may be sent on the PUCCH and/or PUSCH on the PCell at the subframe n+5. In a word, the UE delays the ACK/NACK feedback timing for the SCell until the first available uplink subframe on the PCell.

Figure 22:
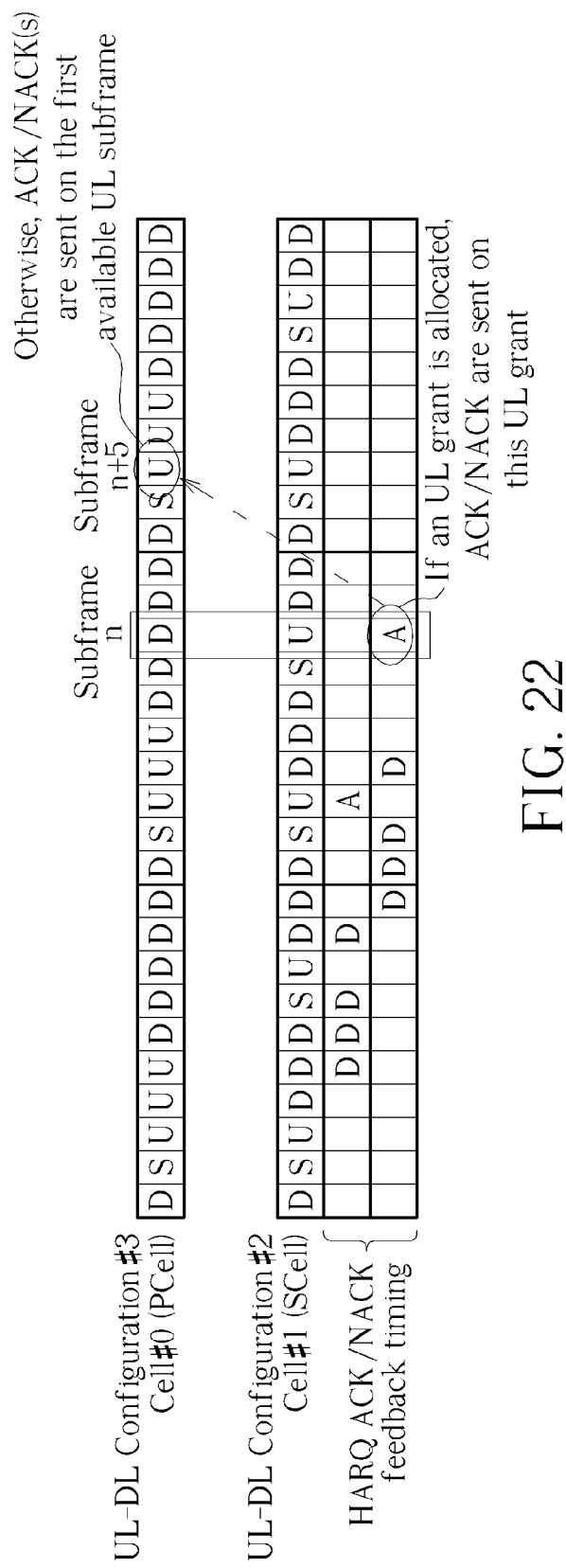
FIG. 22 is a schematic diagram of an uplink control information transmission on the SCell with uplink grant.

However, please refer to FIG. 22, which illustrates if there is an uplink grant (PUSCH) assigned for the subframe n on SCell, the ACK/NACK feedback may be sent on the PUSCH on the SCell at the subframe n. Otherwise, the ACK/NACK feedback may be delayed until the first available uplink subframe (i.e. the subframe n+5 in the abovementioned example) on the PCell.

Figure 23:
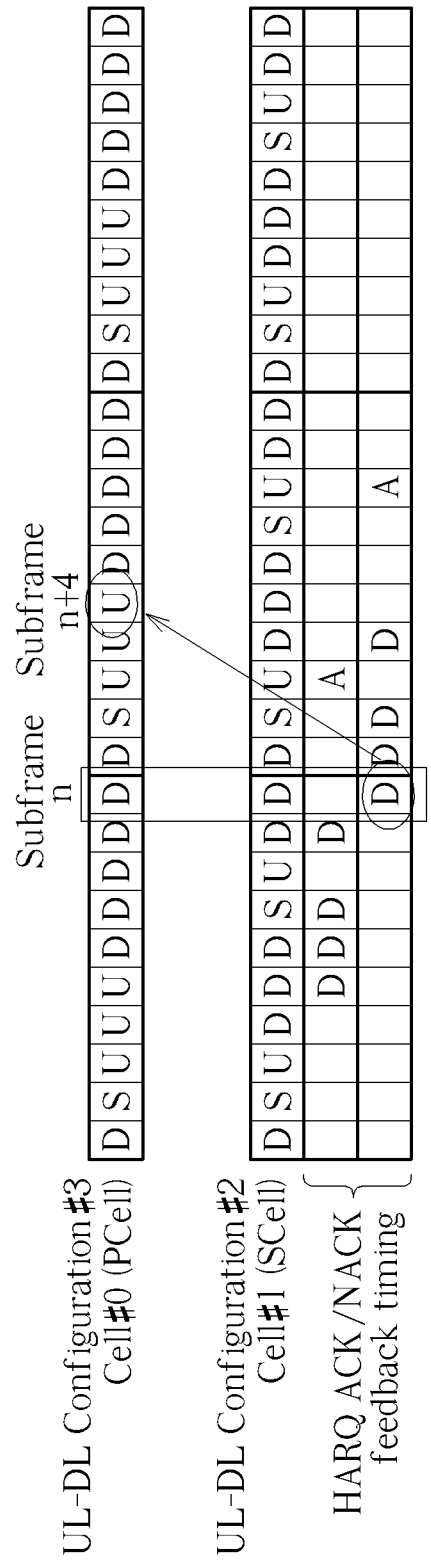
FIG. 23 is a schematic diagram of an uplink control information transmission timing on a primary cell according to the present disclosure.

In addition, please refer to FIG. 23, which illustrates the uplink control information transmission timing on the PCell. In FIG. 23, according to a downlink assignment for an SCell at subframe n, the UE may feedback HARQ ACK/NACK at the first available uplink subframe on the PCell after the subframe n+x. The value x may be determined based on the PCell UL-DL configuration and/or SCell UL-DL configuration. Therefore, the UE may early feedback HARQ ACK/NACK at the subframe n+4 (e.g. x=4) on the PCell for the downlink assignment at the subframe n on the SCell.

Figure 24:
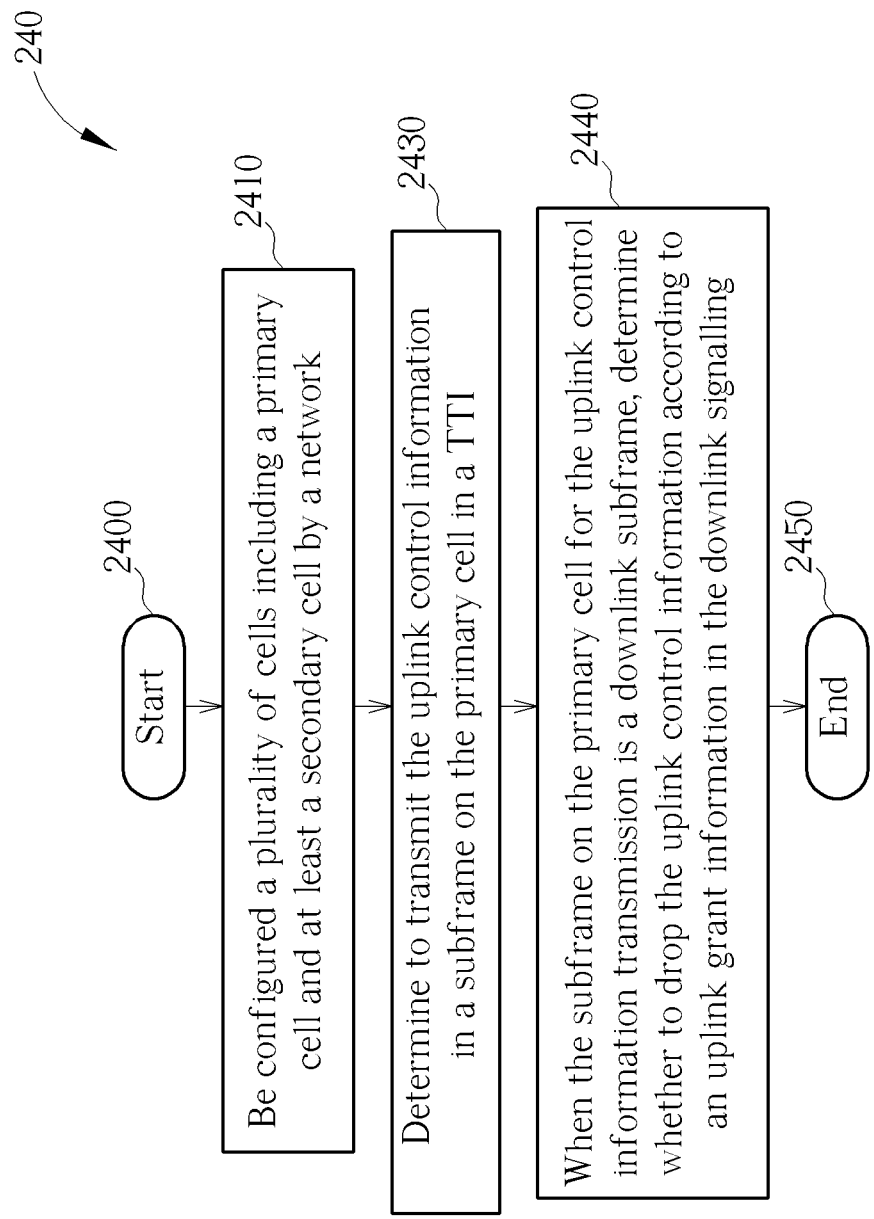
FIG. 24 is a flowchart of an exemplary process according to the present disclosure.

Please refer to FIG. 24, which is a flowchart of a process 240 according to an example of the present disclosure. The process 240 is utilized in a UE of the wireless communication system 10 shown in FIG. 3, to handle a UL control information transmission. The process 240 may be compiled into the program code 214 and includes the following steps:

Step 2400: Start.

Step 2410: Be configured a plurality of cells including a primary cell and at least a secondary cell by a network.

Step 2430: Determine to transmit the uplink control information in a subframe on the PCell in a TTI.

Step 2440: When the subframe on the PCell for the uplink control information transmission is a downlink subframe, drop the uplink control information transmission.

Step 2450: End.

According to the process 240, if the UE needs to report the uplink control information, but the UE does not get available uplink resource on the PCell and/or SCell, the UE drops the uplink control information transmission. For example, please refer to FIG. 25, which illustrates that a UE drops an uplink control information transmission according to the present invention. In FIG. 25, if the UE needs to report an uplink control information at subframe '2', and no uplink grant (PUSCH) is assigned for the subframe '2' on the PCell and SCell, the UE reports the uplink control information on the PUCCH of the PCell. If the UE needs to report UL control information at subframe '3', and the UE gets an uplink grant (PUSCH) for the subframe '3' on the SCell, the UE may report the uplink control information on the PUSCH of the SCell. In another example, if the UE needs to report uplink control information at subframe '4', and the UE does not get an uplink grant (PUSCH) for the subframe '4' on the SCell, the UE may drop the uplink control information transmission.

Figure 26:
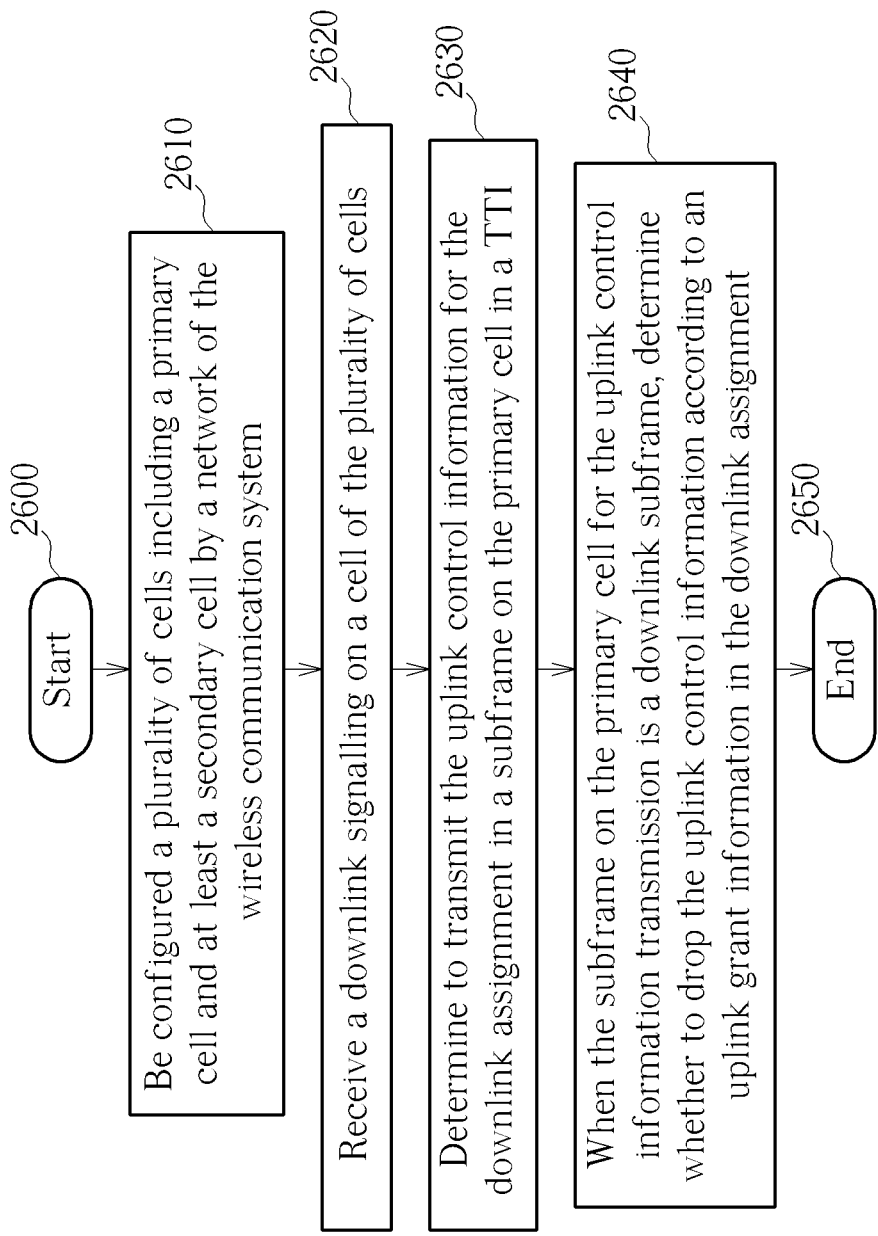
FIG. 26 is a flowchart of an exemplary process according to the present disclosure.

Please refer to FIG. 26, which is a flowchart of a process 260 according to an example of the present disclosure. The process 260 is utilized in a UE of the wireless communication system 10 shown in FIG. 3, to handle a UL control information transmission. The process 260 may be compiled into the program code 214 and includes the following steps:

Step 2600: Start.

Step 2610: Be configured a plurality of cells including a primary cell and at least a secondary cell by a network of the wireless communication system.

Step 2620: Receive a downlink signalling on a cell of the plurality of cells.

Step 2630: Determine to transmit the uplink control information in a subframe on the primary cell in a TTI.

Step 2640: When the subframe on the primary cell for the uplink control information transmission is a downlink subframe, determine whether to drop the uplink control information according to an uplink grant information in the downlink signalling.

Step 2650: End.

Figure 27:
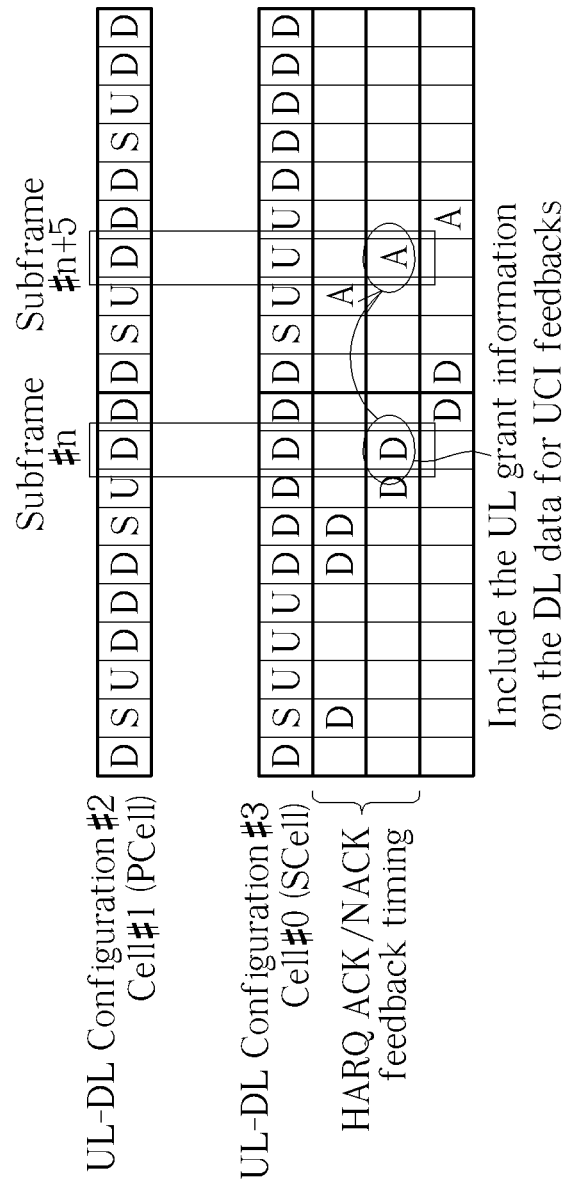
FIG. 27 is a schematic diagram of an uplink control information transmission with uplink grant assigned in the downlink signalling.

According to the process 260, in order to avoid the UE to drop the uplink control information transmission, the UE determines not to drop the uplink control information if an uplink grant information is indicated in the downlink signalling. Thus, the UE can transmit the uplink control information on the uplink grant of the SCell. Please refer to FIG. 27, which is a schematic diagram of an uplink control information transmission with uplink grant assigned in the downlink signalling. In FIG. 27, the downlink data (e.g., the MAC PDU) received at subframe 'n' may include the uplink grant information for the subframe n+5 on SCell. The uplink grant information may be piggybacked in the downlink data PDU for the UE to feedback uplink control information.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

In conclusion, the UE transmits the uplink control information on at least a SCell having uplink resource or on a first uplink subframe after the downlink subframe supposed to be used for uplink control information transmission, of the PCell. Or, the UE may drop the uplink control information.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of uplink control information transmission for a mobile device with carrier aggregation in a wireless communication system, the method comprising:

being configured a plurality of cells including a primary cell and at least a secondary cell by a network of the wireless communication system, wherein the primary cell is a Time Division Duplex (TDD) system, and is configured a TDD uplink and downlink configuration;

when determining to transmit an uplink control information on the primary cell in a subframe of a transmission time interval (TTI), but the subframe in the TTI on the primary cell is configured as a downlink subframe according to the TDD uplink and downlink configuration, transmitting the uplink control information on the at least a secondary cell in the TTI;

wherein the transmitting step comprises:

determining whether an uplink grant is assigned for any of the at least a secondary cell;

when the uplink grant is assigned for the at least a secondary cell, transmitting the uplink control information on the uplink grant of one secondary cell with the highest priority among the secondary cells assigned with the uplink grant; and when no uplink grant is assigned for any of the at least secondary cell, transmitting the uplink control information on a physical uplink control channel (PUCCH) of one secondary cell with the highest priority among PUCCH available secondary cells of the at least a secondary cell.

2. The method of claim 1, wherein the transmitting step further comprises:

determining whether a simultaneous PUCCH-PUSCH transmission is configured to the secondary cell with the highest priority among the PUCCH available secondary cells;

when the secondary cell with the highest priority is configured with the simultaneous PUCCH-PUSCH transmission, transmitting the uplink control information on the PUCCH of the secondary cell with the highest priority.

3. The method of claim 2, further comprising:

when the secondary cell with the highest priority is not configured with the simultaneous PUCCH-PUSCH transmission and the uplink grant is assigned for at least a secondary cell, transmitting the uplink control information on the uplink grant of the secondary cell with the highest priority among the uplink grant assigned secondary cells; and when the secondary cell with the highest priority is not configured with the simultaneous PUCCH-PUSCH transmission but no uplink grant is allocated for any of the at least a secondary cell, transmitting the uplink control information on a PUCCH of the secondary cell with the highest priority among the PUCCH available secondary cells.

4. The method of claim 1, wherein the transmitting step further comprises:

determining whether a simultaneous PUCCH-PUSCH transmission is configured to any of the at least a secondary cells;

when at least a secondary cell is configured with the simultaneous PUCCH-PUSCH transmission, transmitting the uplink control information on a PUCCH of a secondary cell with the highest priority among the simultaneous PUCCH-PUSCH transmission configured secondary cells.

5. The method of claim 4, further comprising:

when no secondary cell is configured with the simultaneous PUCCH-PUSCH transmission but the uplink grant is assigned for the at least a secondary cell, transmitting the uplink control information on the uplink grant of a secondary cell with the highest priority among the uplink grant assigned secondary cells; and when no secondary cell is configured with the simultaneous PUCCH-PUSCH transmission and no uplink grant is assigned for at least a secondary cell, transmitting the uplink control information on a PUCCH of a secondary cell with the highest priority among the PUCCH available secondary cells.

6. The method of claim 1, wherein when the uplink grant is assigned for the at least a secondary cell, the transmitting step further comprises:

when the uplink grant is assigned for the at least a secondary cell, determining whether a simultaneous PUCCH-PUSCH transmission is configured for the uplink grant assigned secondary cells.

7. The method of claim 6, further comprising:

when the uplink grant is assigned for the at least a secondary cells and the simultaneous PUCCH-PUSCH transmission is configured for the secondary cells assigned with the uplink grant, transmitting the uplink control information on a PUCCH of a secondary cells with the highest priority among the simultaneous PUCCH-PUSCH transmission configured secondary cells; and when the uplink grant is assigned to the at least a secondary cells but the simultaneous PUCCH-PUSCH transmission is not configured for the uplink grant assigned secondary cells, transmitting the uplink control information on the uplink grant of a secondary cell with the highest priority among the uplink grant assigned secondary cells.

8. A method of uplink control information transmission for a mobile device with carrier aggregation in a wireless communication system, the method comprising:

being configured a plurality of cells including a primary cell and at least a secondary cell by a network of the wireless communication system, wherein the primary cell is a Time Division Duplex (TDD) system, and is configured a TDD uplink and downlink configuration;

when determining to transmit an uplink control information on the primary cell in a subframe of a transmission time interval (TTI), but the subframe in the TTI on the primary cell is configured as a downlink subframe according to the TDD uplink and downlink configuration, transmitting the uplink control information on the at least a secondary cell in the TTI;

wherein the transmitting step further comprises:

determining whether an uplink grant is assigned for one secondary cell with the highest priority among physical uplink shared channel (PUSCH) available and/or physical uplink control channel (PUCCH) available secondary cells of the at least a second cell;

when the uplink grant is assigned for the secondary cell with the highest priority, transmitting the uplink control information on the uplink grant of the secondary cell with the highest priority; and when no uplink grant is assigned for the secondary cell with the highest priority, transmitting the uplink control information on a PUCCH of the secondary cell with the highest priority.

9. The method of claim 8, further comprising:

determining whether a simultaneous PUCCH-PUSCH transmission is configured to the secondary cell with the highest priority among the PUCCH available secondary cells;

when the secondary cell with the highest priority is configured with the simultaneous PUCCH-PUSCH transmission, transmitting the uplink control information on a PUCCH of the secondary cell with the highest priority; and when the secondary cell with the highest priority is not configured with the simultaneous PUCCH-PUSCH transmission, determining whether an uplink grant is assigned for the secondary cell with the highest priority.

10. The method of claim 9, further comprising:
when the secondary cell with the highest priority is not configured with the simultaneous PUCCH-PUSCH transmission and the uplink grant is assigned for the secondary cell with the highest priority, transmitting the uplink control information on the uplink grant of the secondary cell with the highest priority; and
when the secondary cell with the highest priority is not configured with the simultaneous PUCCH-PUSCH transmission but no uplink grant is allocated for the secondary cell with the highest priority, transmitting the uplink control information on a PUCCH of the secondary cell with the highest priority.

11. A method of uplink control information transmission for a mobile device with carrier aggregation in a wireless communication system, the method comprising:
being configured a plurality of cells including a primary cell and at least a secondary cell by a network of the wireless communication system, wherein the primary cell is a Time Division Duplex (TDD) system, and is configured a TDD uplink and downlink configuration;
when determining to transmit an uplink control information on the primary cell in a subframe of a transmission time interval (TTI), but the subframe in the TTI on the primary cell is configured as a downlink subframe according to the TDD uplink and downlink configuration, transmitting the uplink control information on the at least a secondary cell in the TTI;
wherein the transmitting step further comprises:
determining whether the primary cell has an uplink resource for the uplink control information transmission;
when the primary cell has the uplink resource for the uplink control information transmission, determining whether the primary cell is configured with a simultaneous PUCCH-PUSCH transmission;
when the primary cell has no uplink resource for the uplink control information transmission, determining whether an uplink grant is assigned for any of the at least a secondary cell;
when the primary cell has no uplink resource for the uplink control information transmission but the uplink grant is assigned for the at least a secondary cells, transmitting the uplink control information on the uplink grant of the secondary cell with the highest priority among the uplink grant assigned secondary cells; and
when the primary cell has no uplink resource for the uplink control information transmission and no uplink grant is assigned for any of the at least a secondary cells, transmitting the uplink control information on a PUCCH of one secondary cell with the highest priority among the PUCCH available secondary cells of the at least a secondary cell.

12. A method of uplink control information transmission for a mobile device with carrier aggregation in a wireless communication system, the method comprising:
being configured a plurality of cells including a primary cell and at least a secondary cell by a network of the wireless communication system, wherein the primary cell is a Time Division Duplex (TDD) system, and is configured a TDD uplink and downlink configuration;
when determining to transmit an uplink control information on the primary cell in a subframe of a transmission time interval (TTI), but the subframe in the TTI on the primary cell is configured as a downlink subframe according to the TDD uplink and downlink configuration, transmitting the uplink control information on the at least a secondary cell in the TTI;
wherein the transmitting step further comprises:
determining whether the primary cell has an uplink resource for the uplink control information transmission;
when the primary cell has the uplink resource for the uplink control information transmission, determining whether the primary cell is configured with a simultaneous PUCCH-PUSCH transmission;
when the primary cell has no uplink resource for the uplink control information transmission, determining whether an uplink grant is assigned for any of the at least a secondary cell;
when the primary cell has the uplink resource for the uplink control information transmission and is configured with the simultaneous PUCCH-PUSCH transmission, transmitting the uplink control information on a PUCCH of the primary cell; and
when the primary cell has the uplink resource for the uplink control information transmission but is not configured with the simultaneous PUCCH-PUSCH transmission, determining whether an uplink grant is assigned for the primary cell.

13. The method of claim 12, further comprising:
when the primary cell has the uplink resource for the uplink control information transmission, the primary cell is not configured with the simultaneous PUCCH-PUSCH transmission and no uplink grant is assigned for the primary cell, transmitting the uplink control information on the PUCCH of the primary cell; and
when the primary cell has the uplink resource for the uplink control information transmission, the primary cell is not configured with the simultaneous PUCCH-PUSCH transmission and the uplink grant is assigned for the primary cell, transmitting the uplink control information on the uplink grant of the primary cell.

* * * * *